(12) United States Patent
Harel et al.

(10) Patent No.: US 7,321,636 B2
(45) Date of Patent: Jan. 22, 2008

(54) COMMUNICATION DEVICE WITH SMART ANTENNA USING A QUALITY-INDICATION SIGNAL

(75) Inventors: Haim Harel, New York, NY (US); Yingxue Li, Emmaus, PA (US); Alexander Segalovitz, Kefar Sava (IL)

(73) Assignee: Magnolia Broadband Inc., Bedminster, NJ (US)

( * ) Notice: Subject to any disclaimer, the term of this patent is extended or adjusted under 35 U.S.C. 154(b) by 853 days.

(21) Appl. No.: 10/141,342

(22) Filed: May 9, 2002

(65) Prior Publication Data

US 2003/0002594 A1 Jan. 2, 2003

Related U.S. Application Data

(60) Provisional application No. 60/294,290, filed on May 31, 2001.

(51) Int. Cl.
*H04L 27/00* (2006.01)
*H04L 1/02* (2006.01)
*H04B 1/02* (2006.01)
*H04B 7/00* (2006.01)

(52) U.S. Cl. ............... 375/299; 375/267; 455/101; 455/103; 455/69

(58) Field of Classification Search ........... 342/368, 342/372, 378, 383, 373, 375; 455/101, 103, 455/104–105, 63, 68, 69, 126–127, 272, 455/504–506, 132–136, 522, 273, 423, 63.1; 375/146, 260, 347, 346, 299, 267; 370/480, 370/204
See application file for complete search history.

(56) References Cited

U.S. PATENT DOCUMENTS 5,109,390 A 4/1992 Gilhousen et al.
5,577,265 A 11/1996 Wheatley, III
5,642,353 A 6/1997 Roy, III et al.

(Continued)

FOREIGN PATENT DOCUMENTS

EP 0 986 193 3/2000

(Continued)

OTHER PUBLICATIONS

Communication from European Patent Office dated Sep. 27, 2004 with enclosed Supplementary Partial European Search Report for Application No. PCT/US0214437, 6 pages.

(Continued)

*Primary Examiner*—Mohammed Ghayour
*Assistant Examiner*—Sophia Vlahos
(74) *Attorney, Agent, or Firm*—Pearl Cohen Zedek Latzer, LLP

(57) ABSTRACT

Communication is performed for a first communication device having a set of antenna elements. A quality-indication signal is received from a second communication device. A complex weighting is calculated based on the quality-indication signal. A pre-transmission signal is modified based on the complex weighting to produce a set of modified-pre-transmission signals. Each modified pre-transmission signal from the set of modified-pre-transmission signals is uniquely associated with an antenna element from the set of antenna elements. The set of modified-pre-transmission signals is sent from the set of antenna elements to produce a transmitted signal.

75 Claims, 13 Drawing Sheets

U.S. PATENT DOCUMENTS

| | | | |
|---|---|---|---|
| 5,771,022 | A | 6/1998 | Vaughan et al. |
| 5,781,845 | A | 7/1998 | Dybdal et al. ............... 455/65 |
| 5,832,044 | A * | 11/1998 | Sousa et al. ............... 375/347 |
| 5,832,387 | A | 11/1998 | Bae et al. ................... 455/522 |
| 5,960,039 | A | 9/1999 | Martin et al. ............... 375/267 |
| 5,991,330 | A | 11/1999 | Dahlman et al. |
| 5,999,826 | A * | 12/1999 | Whinnett ................... 455/561 |
| 6,137,840 | A | 10/2000 | Tiedemann, Jr. et al. |
| 6,167,039 | A | 12/2000 | Karlsson et al. |
| 6,185,440 | B1 | 2/2001 | Barratt et al. |
| 6,226,509 | B1 * | 5/2001 | Mole et al. ................. 455/302 |
| 6,236,363 | B1 | 5/2001 | Robbins et al. |
| 6,236,839 | B1 | 5/2001 | Gu et al. |
| 6,259,683 | B1 | 7/2001 | Sekine et al. |
| 6,266,528 | B1 | 7/2001 | Farzaneh |
| 6,304,215 | B1 | 10/2001 | Proctor, Jr. et al. |
| 6,307,506 | B1 | 10/2001 | Despain |
| 6,317,587 | B1 | 11/2001 | Tiedemann, Jr. et al. |
| 6,330,294 | B1 | 12/2001 | Ansbro et al. |
| 6,343,218 | B1 * | 1/2002 | Kaneda et al. ............... 455/522 |
| 6,349,218 | B1 | 2/2002 | Nakagawa et al. |
| 6,351,499 | B1 | 2/2002 | Paulraj et al. ............... 375/267 |
| 6,369,758 | B1 | 4/2002 | Zhang ........................ 342/383 |
| 6,392,988 | B1 | 5/2002 | Allpress et al. |
| 6,492,942 | B1 | 12/2002 | Kezys |
| 6,636,495 | B1 * | 10/2003 | Tangemann ................. 370/334 |
| 6,704,370 | B1 | 3/2004 | Chheda et al. |
| 6,745,009 | B2 | 6/2004 | Raghothaman |
| 6,810,264 | B1 * | 10/2004 | Park et al. ................... 455/522 |
| 6,859,643 | B1 | 2/2005 | Ma et al. |
| 6,882,228 | B2 | 4/2005 | Rofougaran |
| 2001/0005685 | A1 | 6/2001 | Nishimori et al. |
| 2001/0020915 | A1 | 9/2001 | Proctor, Jr. |
| 2001/0022557 | A1 | 9/2001 | Rouphael et al. |
| 2002/0008672 | A1 | 1/2002 | Gothard et al. |
| 2002/0021683 | A1 | 2/2002 | Holtzman et al. |
| 2002/0058510 | A1 * | 5/2002 | Mohebbi ..................... 455/437 |
| 2002/0145968 | A1 | 10/2002 | Zhang et al. ............... 370/206 |
| 2003/0112880 | A1 | 6/2003 | Walton et al. |
| 2004/0048584 | A1 | 3/2004 | Vaidyanathan et al. |
| 2004/0085239 | A1 | 5/2004 | Ukena et al. |
| 2005/0059355 | A1 | 3/2005 | Liu |
| 2005/0143113 | A1 | 6/2005 | Lee et al. |

FOREIGN PATENT DOCUMENTS

| | | |
|---|---|---|
| EP | 0 999 658 A2 | 5/2000 |
| EP | 1 204 217 A1 | 5/2002 |
| EP | 1 255 369 A1 | 11/2002 |
| EP | 1 262 031 | 12/2002 |
| EP | 1 282 242 | 2/2003 |
| EP | 1 282 244 | 2/2003 |
| EP | 1 284 545 | 2/2003 |
| GB | 2 353 437 A | 2/2001 |
| GB | 2353437 * | 2/2001 |
| GB | 2353437 A * | 2/2001 |
| JP | 09-238098 | 9/1997 |
| JP | 2000-151484 | 5/2000 |
| WO | WO 97/24818 | 7/1997 |
| WO | WO 00/36764 | 6/2000 |
| WO | WO 00/79701 | 12/2000 |
| WO | WO 01/69814 | 9/2001 |
| WO | WO 02/13493 A1 | 2/2002 |
| WO | WO 03/005606 A1 | 1/2003 |
| WO | WO 03/073648 A1 | 9/2003 |
| WO | WO 03/090386 | 10/2003 |
| WO | WO 04/045108 | 5/2004 |
| WO | WO 2005/081444 | 9/2005 |

OTHER PUBLICATIONS

Derryberry et al., "Transmit Diversity in 3G CDMA Systems", Wideband Wireless Access Technologies to Broadband Internet, IEEE Communications Magazine, Apr. 2002, pp. 68-75.

Rashid-Farrokhi, et al., "Transmit Beamforming and Power Control for Cellular Wireless Systems", IEEE Journal on Selected Areas in Communications, vol. 16, No. 8, Oct. 1998, pp. 1437-1450.

International Search Report for International Application No. PCT/US2006/039400 mailed Feb. 2, 2007.

* cited by examiner

COMMUNICATION DEVICE WITH SMART ANTENNA USING A QUALITY-INDICATION SIGNAL

CROSS-REFERENCE TO RELATED APPLICATIONS

This application claims priority to now abandoned U.S. Provisional Patent Application No. 60/294,290, entitled "Smart Antennae: Using Standard Power Control Signaling On Cellular Systems For Smart Antenna Control within Cell Phone," filed on May 31, 2001, the entirety of which is incorporated herein by reference.

This application is also related to co-pending U.S. patent application Ser. No. 10/082,351, entitled "Smart Antenna Based Spectrum Multiplexing Using a Pilot Signal," filed on Feb. 26, 2002, the entirety of which is incorporated herein by reference.

BACKGROUND

The invention relates generally to communications and more particularly to a system and method for using a quality-indication signal added to a transmitted signal in a communication system, and used by the receiving end, in conjunction with multiple antenna elements. The receiver can use a separation process known as spatial filtering, or also referred to herein as smart antenna.

Broadband networks having multiple information channels are subject to certain types of typical problems such as inter-channel interference, a limited bandwidth per information channel, inter-cell interference that limit the maximum number of serviceable users, and other interference. The usage of smart antenna techniques (e.g., using multiple antenna elements for a separation process known as spatial filtering), at both ends of the wireless communications channels, can enhance spectral efficiency, allowing for more users to be served simultaneously over a given frequency band Power-control signaling is another technique used to minimize inter-channel interference and increase network capacity. For example, mobile communication standards include a high rate, continuous, power-control signaling to ensure that mobile communication devices do not transmit too much or too little power. More specifically, based on the strength of the signal sent from the communication device and received at the basestation, the basestation sends a power-control signal to the mobile communication device indicating whether the communication device should increase or decrease the total power of its transmitted signal. The transmission rates for each value of the power-control signals are, for example, 1.25 ms for cdmaOne (IS-95)/CDMA2000, and 0.66 ms for WCDMA.

The known uses of power-control signaling have been limited only to adjusting the total power of the signal transmitted from the communication device. Next generation communication devices, however, can use multiple antenna elements (also referred to herein as a "smart antenna") for a separation process known as spatial filtering. Thus, a need exists for an improved system and method that can combine the advantages of power-control signaling with the advantages of smart antennas.

SUMMARY OF THE INVENTION

Communication is performed for a first communication device having a set of antenna elements. A quality-indication signal is received from a second communication device (e.g., a basestation). A complex weighting is calculated based on the quality-indication signal. A modulated pre-transmission signal is modified based on the complex weighting to produce a set of modified pre-transmission signals. Each modified pre-transmission signal from the set of modified-pre-transmission signals is uniquely associated with an antenna element from the set of antenna elements. The set of modified pre-transmission signals is sent from the set of antenna elements to produce a transmitted signal. The complex weighting is associated with total power of the transmitted signal and at least one from a phase rotation and a power ratio associated with each antenna element from the set of antenna elements.

DETAILED DESCRIPTION

Figure 1:
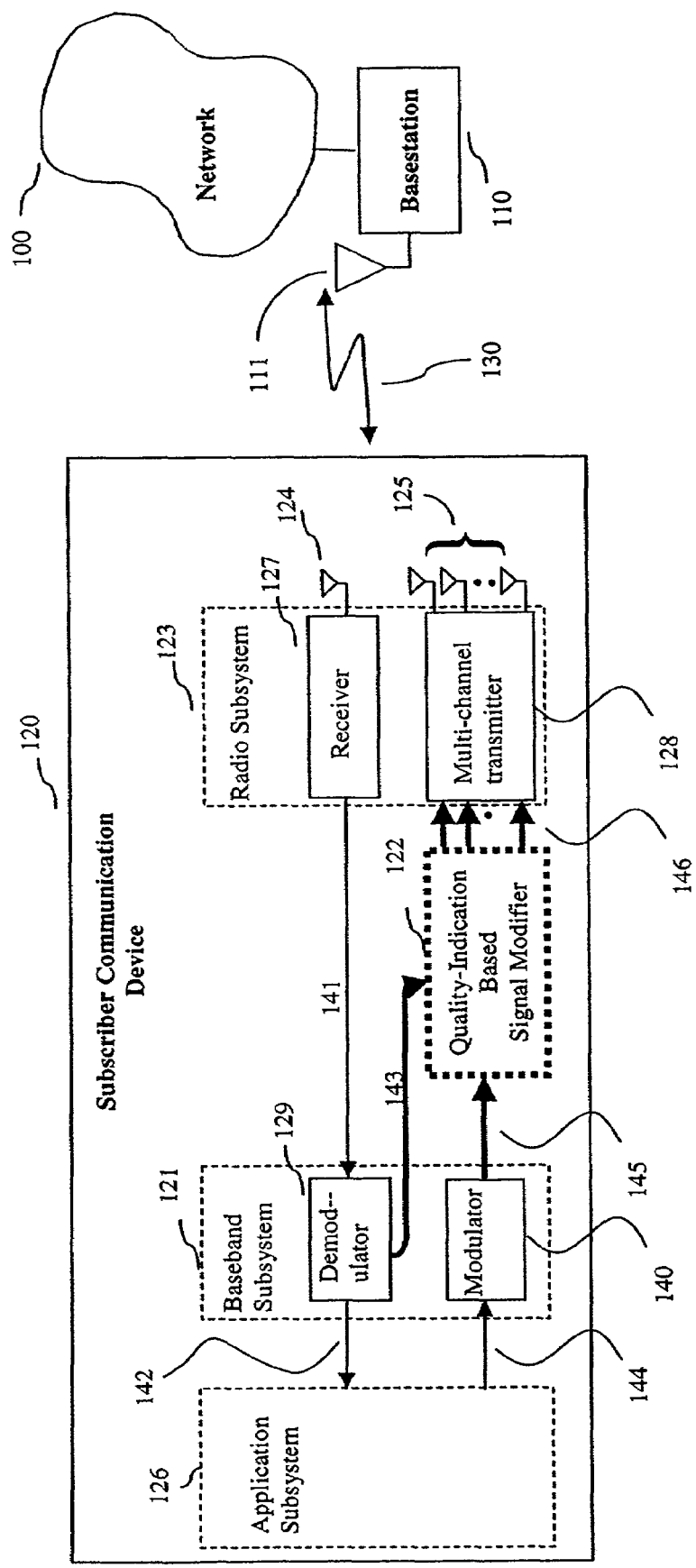
FIG. 1 shows a system block diagram of a communication network according to an embodiment of the invention.

A transmitted signal sent from a subscriber communication device to a second communication device (e.g., a basestation) can be weakened by time or by propagation-geometry-dependent fading and multipath. In other words, a signal sent from a subscriber communication device to a basestation will undergo destructive interference due to the fact that the transmitted signal propagates along different paths and reaches the basestation as a combination of the signals each having a different phase.

Accordingly, by controlling the phase of the transmitted signal at the subscriber communication device, the combination of signals received at the basestation can constructively interfere rather than destructively interfere, or alternatively reduce the intensity of the destructive interference. The phase of the transmitted signal can be controlled through the use of multiple antenna elements at the subscriber communication device. If the rate at which the transmitted signal is controlled exceeds the rate of fading, then the basestation will receive the transmitted signal at a relatively constant rate of power at a substantially optimized power. Because the rate of fading is relatively slow (e.g., between few Hz and a couple of hundred Hz) compared to the rate of power-control signaling in certain known communication protocols (e.g., around 1000 s of Hz), power-control signaling can be used to tune a smart antenna to substantially optimize the transmission of signals from a subscriber communication device to a basestation.

The tuning of the subscriber communication device is done through the use of complex weighting. The signals associated with each antenna element from a set of multiple antenna elements can be adjusted based on the complex weighting. The term "complex weighting" relates to real and imaginary components of a signal, which can be varied to define the magnitude and phase of the signal. Because each of these signals can be adjusted differently, each signal is a low-correlation version of the pre-transmission signal upon which the transmitted signal is based. In other words, the signals associated with each antenna element can be adjusted separately from each other based on the complex weighting so that these signals are a low-correlation version of the pre-transmission signal. The complex weighting is calculated to adjust the total power of the transmitted signal and the phase rotation and/or power ratio associated with each antenna element.

Note that term "quality-indication signal" is used herein to mean a signal having information about the quality of the communication link between a communication source sending the signal with multiple antenna elements and a communication device receiving the signal. For example, the quality-indication signal can be a power-control signal according to a code-division multiple access (CDMA) protocol. Such a CDMA protocol can be, for example, CDMA-IS-95 A/B, CDMA 2000 1X/RTT, CDMA 2000 3X, CDMA EV-DO, wideband CDMA (WCDMA), third-generation (3G) Universal Mobile Telecommunications System (UMTS) and fourth-generation (4G) UMTS. In fact, although the embodiments described herein are often in reference to such a power-control signal, any type of quality-indication signal in accordance with any type of communication protocol can be appropriate.

In addition, although the embodiments described herein are in reference to a basestation sending a quality-indication signal to a subscriber communication device having multiple antenna elements, alternative embodiments are possible. For example, in alternative embodiments, a quality-indication signal can be sent from a subscriber communication device to a basestation having multiple antenna elements. Alternatively, a quality-indication signal can be sent from one communication device to another communication device having multiple antenna elements.

FIG. 1 shows a system block diagram of a wireless communication network according to an embodiment of the invention. As shown in FIG. 1, network 100 is coupled to basestation 110, which includes antenna 111. Subscriber communication device 120 is coupled to basestation 110 by, for example, a wireless communication link 130. Subscriber communication device 120 includes baseband subsystem 121, quality-indication based signal modifier 122, radio subsystem 123, receive antenna 124, array of transmit antennas 125, and application subsystem 126, which handles the voice/data/display/keyboard, etc. The baseband subsystem 121 comprises two main portions: a modulator 140 and a demodulator 129. The radio subsystem 123 comprises two main portions: a receiver 127 and a multi-channel transmitter 128.

Baseband subsystem 121, quality-indication based signal modifier 122, the multi-channel transmitter 128, and transmit antenna array 125 are portions of a transmitter for subscriber communication device 120.

Baseband subsystem 121 is the portion of the wireless communications system that receives a modulated received signal 141, demodulates it to produce demodulated received signal 142 and to extract the quality indicator sent from the other side of the wireless link 130. Demodulated received signal 142 is provided to application subsystem 126. The extracted quality indicator is fed into the quality-indication based signal modifier 122 via quality-indication signal 143. Quality-indication based signal modifier 122 modifies the pre-transmission signal 145 in such a way that the other side of the wireless link 130 (e.g., basestation 110), undergoes improved reception without necessarily increasing the combined power level transmitted from the subscriber communication device 120. Rather, by manipulating the weights of the various power amplifiers that feed their respective antenna elements in the array of transmit antennas 125, better multipath behavior is achieved at the other side of the wireless link 130 (e.g., at basestation 110), as explained in further detail below. Said another way, application subsystem 126 receives information for transmission such as, for example, data and/or voice information. Application subsystem 126 sends an unmodulated transmission signal 144 to modulator 140 of baseband subsystem 121. Modulator 140 modulates unmodulated transmission signal 144 to produce pre-transmission signal 145, which is provided to quality-indication signal modifier 122. Quality-indication signal modifier calculates a complex weighting based on the quality-indication signal 143 and modifies the pre-transmission signal to produce a plurality of modified pre-transmission signals 146. Each modified pre-transmission signal is uniquely associated with an antenna element from the array of transmit antennas 145. The modified pre-transmission signal 146 is sent to multi-channel transmitter 128, which forwards the modified pre-transmission signals 146 to the array of transmit antennas 125. The array of transmit antennas 125 sends an effective combined transmitted signal based on the modified pre-transmission signal 146.

Figure 2:
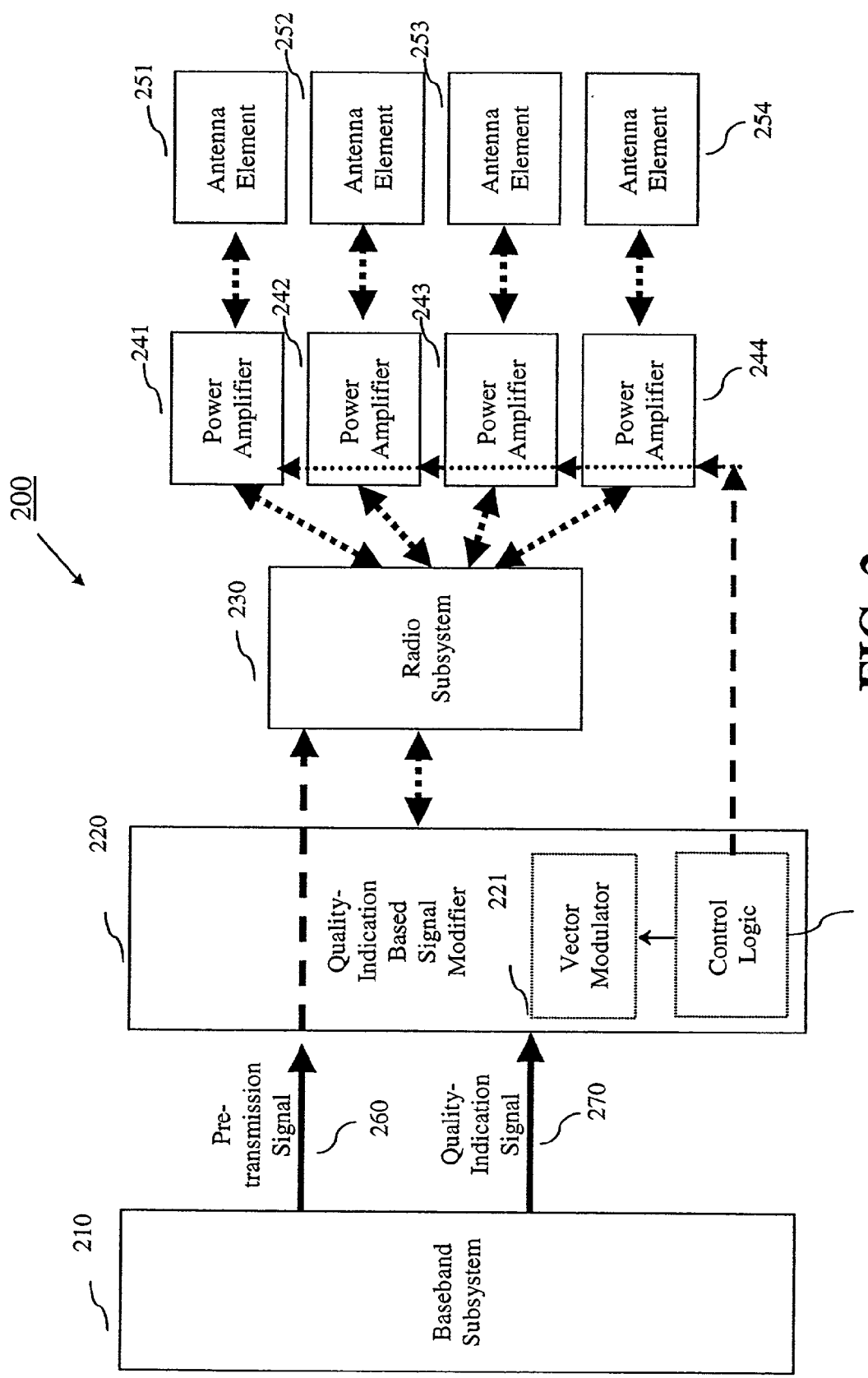
FIG. 2 shows a system block diagram of a transmitter for the subscriber communication device shown in FIG. 1.

FIG. 2 shows a system block diagram of a transmitter for the subscriber communication device shown in FIG. 1. The transmitter system 200 includes baseband subsystem 210, quality-indication based signal modifier 220, radio subsystem 230, power amplifiers 241, 242, 243 and 244, and antenna elements 251, 252, 253 and 254. Baseband subsystem 210, quality-indication based signal modifier 220, radio subsystem 230, antenna elements 251, 252, 253 and 254, correspond to baseband subsystem 121, quality-indication based signal modifier 122, radio subsystem 123, and transmit antenna array 125, shown in FIG. 1.

Note that although the subscriber communication device is shown FIG. 2 as having four antenna elements 251 through 254 and four corresponding power amplifiers 241 and 244, any number of two or more antenna elements (and corresponding power amplifiers) is possible. Thus, it will be understood that although the subscriber communication device is described herein as having four antenna elements, other embodiments can have any number of two or more antenna elements.

Baseband subsystem 210 is coupled to quality-indication based signal modifier 220 and sends a pre-transmission signal 260 and a quality-indication signal 270. Quality-indication based signal modifier 220 includes vector modulator 221 and control logic 222. Quality-indication signal modifier 220 is coupled to radio subsystem 230 and power amplifiers 241 through 244. More specifically, quality-indication based signal modifier 220 provides modified pre-transmission signals to radio subsystem 230. Control logic 222 of quality-indication based signal modifier 220 provides complex weighting to vector modulator 221 and power amplifiers 241 through 244, as described below in further detail.

Radio subsystem 230 receives the modified pre-transmission signal from quality-indication based signal modifier 220. The modified pre-transmission signal can be, for example either baseband signals, IF signals, or RF signals. Radio subsystem 230 converts the received pre-transmission signal into radio frequency (RF) signals, which are provided to power amplifiers 241 through 244.

Power amplifiers 241 through 244 each receive RF modified pre-transmission signals and amplify those signals for transmission. Power amplifiers 241 through 244 are coupled to antenna elements 251 through 254, respectively. Power amplifiers 241 through 244 provide the amplified signals to antenna elements 251 through 254, each of which sends its respective RF modified pre-transmission signal to produce a transmitted signal. In other words, each antenna element 251 through 254 sends a respective signal component all of which form a transmitted signal.

Figure 3:
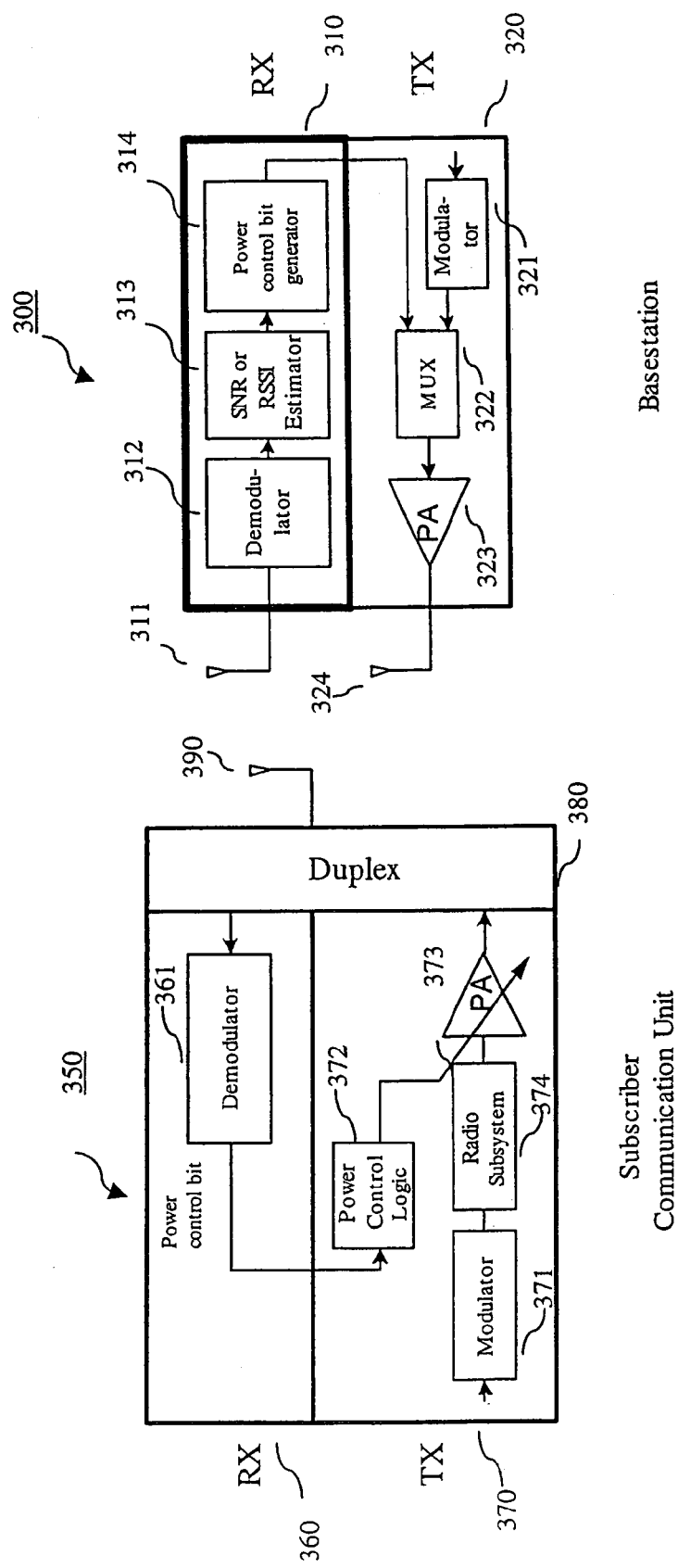
FIG. 3 shows a system block diagram of a basestation and subscriber communication device according to a known system.

FIG. 3 shows a system block diagram of a basestation and subscriber communication device according to a known system. This is helpful for understanding how prior CDMA basestation systems employ a power-control signal to adjust the transmit power of the subscriber communication device.

In FIG. 3, basestation 300 includes receiver (Rx) 310 and transmitter (Tx) 320. Receiver 310 includes demodulator 312, signal-to-noise ratio (SNR) or RSSI (RF Signal Strength Indicator) estimator 313 and power control bit generator 314. Receiver 310 is coupled to antenna 311. Transmitter 320 includes modulator 321, multiplexer 322 and power amplifier (PA) 323. Transmitter 320 is coupled to antenna 324.

Subscriber communication unit 350 includes receiver 360, transmitter 370, duplexer/diplexer 380 and antenna 390. Duplexer/diplexer 380 can comprise a filter separating different bands like cellular service versus Personal Communication Service (PCS), and/or separation of receive/transmit; typically, duplexer/diplexer 380 has one port connected to one antenna, and other port connected to various radio circuitries that operate either simultaneously or alternatively. Receiver 360 includes demodulator 361. Transmitter 370 includes modulator 371, power control logic 372, power amplifier (PA) 373 and radio subsystem 374.

Antenna 311 at the basestation receiver 310 is coupled to demodulator 312, which is in turn coupled to SNR or RSSI estimator 313. SNR or RSSI estimator 313 is coupled to power control bit generator 314, which is in turn coupled to multiplexer 322. Multiplexer 322 is also coupled to modulator 321 and power amplifier (PA) 323, which is in turn coupled to antenna 324.

Antenna 390 at the receiver 360 of subscriber communication device 350 is coupled to duplexer/diplexer 380. Duplexer/diplexer 380 relays received signals from antenna 390 to receiver 360 and relays signals sent from transmitter 370 to antenna 390. More specifically, duplexer/diplexer 380 is coupled to demodulator 361, which is coupled to power control logic 372.

Turning to the transmitter 370, modulator 371 receives the pre-transmission signal for transmission and provides it to radio subsystem 374. Radio subsystem 374 converts the pre-transmission signal into a RF signals, and forwards it to power amplifier 373. Power amplifier 373 is also coupled to power-control logic 372, which provides power-control information. More specifically, the received signals include a quality-indication signal such as, for example, a power-control signal having one or more power-control bits. These power-control bits indicate the manner in which the subscriber communication device should modify the total power of the transmitted signal. The power control indication is originally generated at the other side of the wireless communications link (e.g., basestation 300), and is sent back to the subscriber communication unit 350 to obtain improved signal quality in such a way that will produce reduced interference. These power-control bits are provided to power amplifier 373, which adjusts the total power for the transmitted signal based on the power-control bits. Power amplifier 373 is coupled to duplexer/diplexer 380, which forwards the amplified pre-transmission signal to antenna element 390 for transmission.

Note that in the known subscriber communication device 350, the power control logic 372 provides information based on the received power control bit to power amplifier 373. The only adjustment to the transmit signal is an adjustment to the power amplifier output level.

Figure 4:
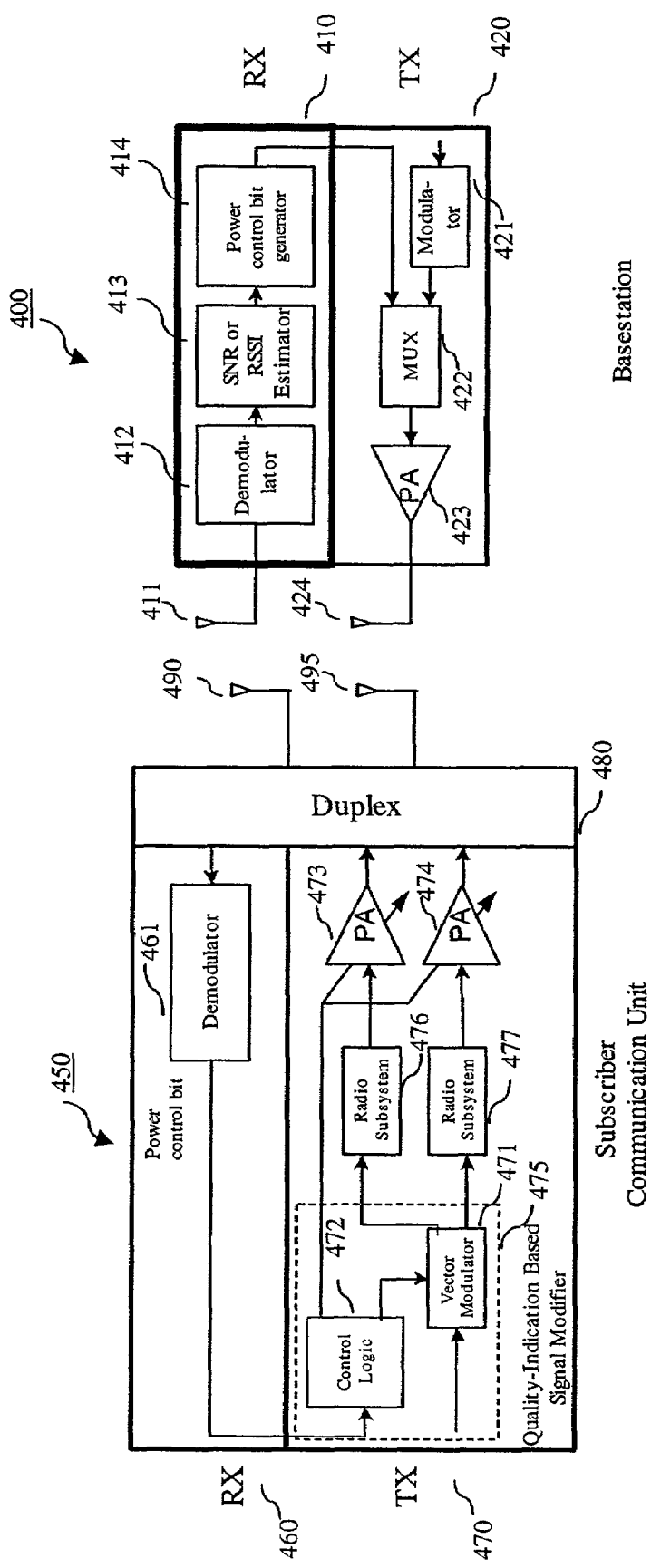
FIG. 4 shows a system block diagram of a basestation and a subscriber communication device having two transmitting antennas, according to an embodiment of the invention.

FIG. 4 shows a system block diagram of a basestation and subscriber communication device according to an embodiment of the invention. Basestation 400 includes a receiver (Rx) 410 and transmitter (Tx) 420. Receiver 410 includes antenna 411, demodulator 412, SNR or RSSI estimator 413 and power control bit generator 414. Transmitter 420 includes modulator 421, multiplexer 422, power amplifier (PA) 423 and antenna 424.

Subscriber communication unit 450 includes receiver 460, transmitter (Tx) 470, dual duplexer/diplexer 480 and antennas 490 and 495. Dual duplexer/diplexer 480 is, for example, a set of two units, each comprising a duplexer/diplexer. Receiver 460 includes demodulator 461. Transmitter 470 includes quality-indication based signal modifier 475, which includes vector modulator 471 and power control logic 472. Transmitter 470 also includes radio subsystems 476 and 477, and power amplifiers 473 and 474.

Antenna 411 at the basestation receiver 410 is coupled to demodulator 412, which is in turn coupled to SNR estimator 413. SNR or RSSI estimator 413 is coupled to power control bit generator 414, which is in turn coupled to multiplexer 422. Multiplexer 422 is also coupled to modulator 421 and power amplifier 423, which is in turn coupled to antenna 424.

Subscriber communication unit 450 includes antennas 490 and 495 that are used for both reception and transmission, and are coupled to dual duplexer/diplexer 480. Dual duplexer/diplexer 480 is coupled to receiver 460 and transmitter 470. Note that for the purpose of this embodiment, the receiver may use only one of the two antennas 490 and 495, or a combination of them. Receiver 460 includes demodulator 461, which is coupled to control logic 472 of quality-indication based signal modifier 475. Control logic 472 is coupled to vector modulator 471 of quality-indication based signal modifier 475. Vector modulator 471 is coupled to radio subsystems 476 and 477, which are coupled to power amplifiers 473 and 474, respectively. Power amplifiers 473 and 474 are also coupled to control logic 472. In addition, power amplifiers 473 and 474 are coupled to antenna elements 490 and 495, respectively, through dual duplexer/diplexer 480.

Demodulator 461 receives signals from antennas 490 and 495 via the dual duplexer/diplexer 480 to produce a quality-indication signal. This quality-indication signal can be, for example, a power-control signal having one or more power-control bits. This quality-indication signal is provided to control logic 472. Note that demodulator 461 performs other functions and produces other signals, which are not shown in FIG. 4 for the purpose of clarity in the figure. Control logic 472 produces complex weighting values and forwards these complex weighting values to vector modulator 471 and power amplifiers 473 and 474. Power amplifier 473 is associated with antenna element 490 and power amplifier 474 is associated with antenna element 495.

Note that the control logic 472 is different from the power control logic 372 of the known subscriber communication device 350 shown in FIG. 3. The power control logic 372 merely provided power control information to power amplifier 373, whereas the control logic 472 shown in FIG. 4 provides complex weighting to both the vector modulator 471 and the set of power amplifiers 473 and 474. This allows not only the total power of the transmitted signal to be adjusted based on the received power-control bit, but in addition, allows the phase rotation and/or the power ratio associated with each antenna element 490 and 495 to be adjusted based on the received power control information. Accordingly, this allows the transmitted signal to be optimal with respect to its reception by basestation 400. Once this optimized signal is received by basestation 400, basestation 400 can then send a power-control signal to subscriber communication device 450 indicating that subscriber communication 450 should adjust the total power of its transmitted signal. Consequently, by optimizing the transmitted signal, the total power of the transmitted signal can be reduced, versus the case of a communication device with a single antenna, as described in FIG. 3. Such an optimization beneficially allows, for example, an increase in the battery lifetime of subscriber communication unit 450, an increase in the cellular system capacity of the communication network, and a decrease in the radiation hazard to the user of the subscriber communication unit 450.

The complex weighting provided by control logic 472 can be based on the total power of the transmitted signal and one or both of the phase rotation and the power ratio associated with each antenna element 490 and 495.

Figure 5:
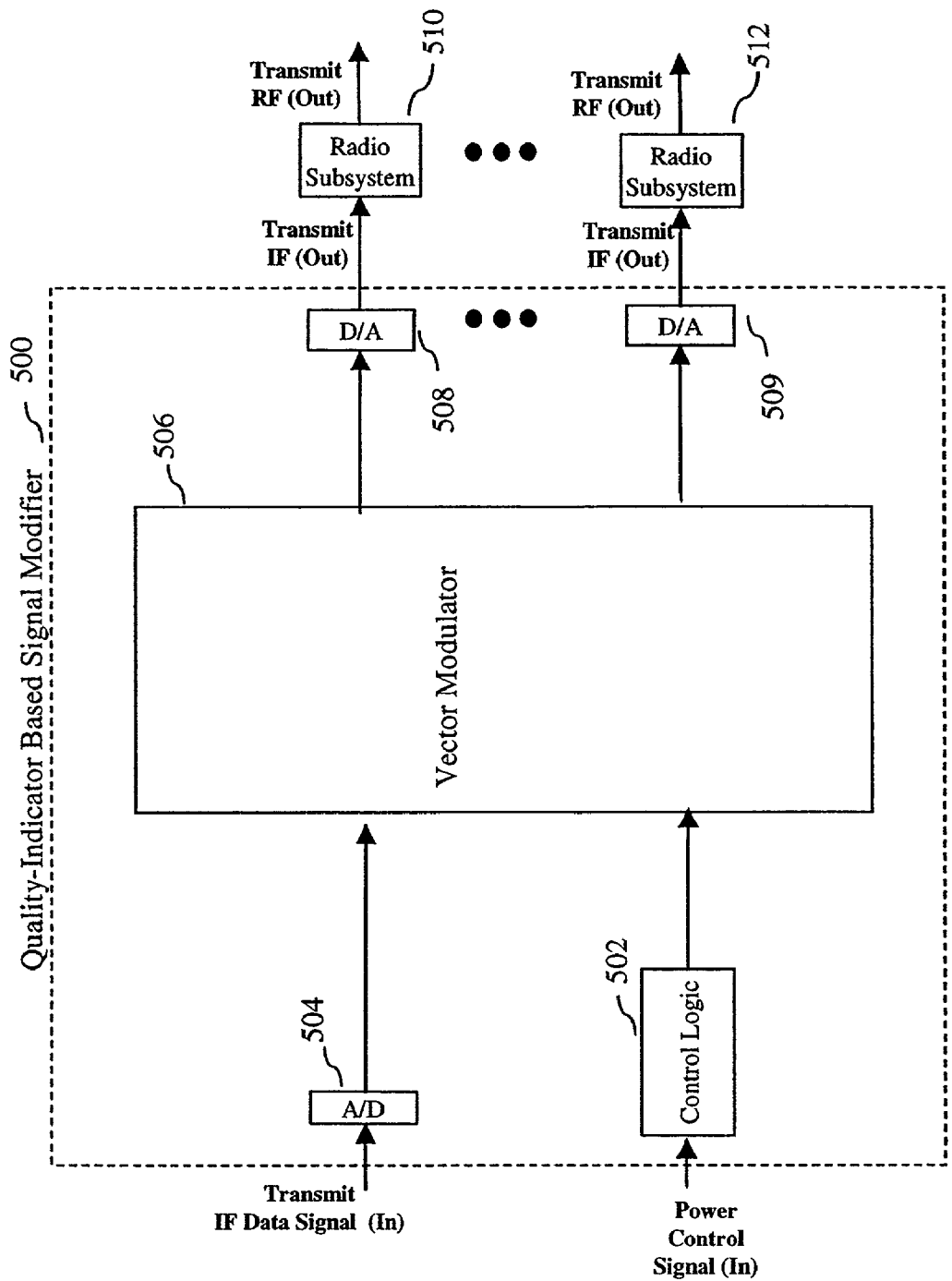
FIG. 5 illustrations a portion of the transmitter system for subscriber communication device, according to another embodiment of the invention.

FIG. 5 illustrates a portion of the transmitter system for subscriber communication device, according to another embodiment of the invention. Quality-indicator based signal modifier 500 includes control logic 502, analog-to-digital (A/D) converter 504, vector modulator 506 and digital-to-analog (D/A) converters 508 through 509. D/A converter 508 is coupled to radio subsystem 510 and D/A converter 509 is coupled to radio subsystem 512.

Note that the D/A converters and radio subsystems are repeated for a number that corresponds to the number of antenna elements. In other words, if subscriber communication device has N number of antenna elements, then the subscriber communication device has N number of D/A converters and radio subsystems. Thus, as shown in FIG. 5, D/A converter 508 and radio subsystem 510 are associated with one antenna element from a set of antenna elements (not shown in FIG. 5). D/A converter 509 and radio subsystem 512 are associated with a different antenna element from the set of antenna elements. Any remaining antenna elements from the set of antenna elements are each also uniquely associated with a D/A converter and a radio subsystem.

The quality-indicator based signal modifier 500 receives an IF pre-transmission signal and power-control signal. The IF pre-transmission signal is received by A/D converter 504, which converts the analog pre-transmission signal to a digital form. The A/D converter 504 forwards the digital pre-transmission signal to vector modulator 506. The power control signal is received by control logic 502, which determines complex weighting values.

The complex weighting is calculated by determining the appropriate weighting value associated with the in-phase signal component and the quadrature signal component associated with each antenna element. For example, in the case where the phase rotation is being adjusted, the weighting value for the in-phase signal component will be different than the weighting value for the quadrature signal component. In the case where the power ratio is being adjusted, the weighting value for the in-phase signal component and the weighting value for the quadrature signal component are simultaneously increased or decreased for a given antenna element in parallel. Finally, in the case where the total power of the transmitted signal is being adjusted, the weighting value for the in-phase signal component and the weighting value for the quadrature signal component are simultaneously increased or decreased for all of the antenna elements in parallel.

Control logic 502 provides the complex weighting values to vector modulator 506. Vector modulator 506 receives the digital pre-transmission signal from A/D converter 504 and the complex weighting values from control logic 502. Vector modulator 506 splits the pre-transmission signal into a number of pre-transmission signals corresponding to the number of antenna elements. The vector modulator 506 then applies the complex weighting to the various pre-transmission signals so that each pre-transmission signal, which uniquely corresponds to an antenna element, modifies the respective pre-transmission signal based on the complex weighting values. The modified pre-transmission signals are then provided to D/A converters 508 through 509, which convert the pre-transmission signal from digital to analog form. Those pre-transmission signals are then provided to radio subsystems 510 through 512, respectively, which then convert the IF form of the pre-transmission signals into an RF form. These signals are then forwarded to power amplifiers and respective antenna elements (not shown in FIG. 5).

Figure 6:
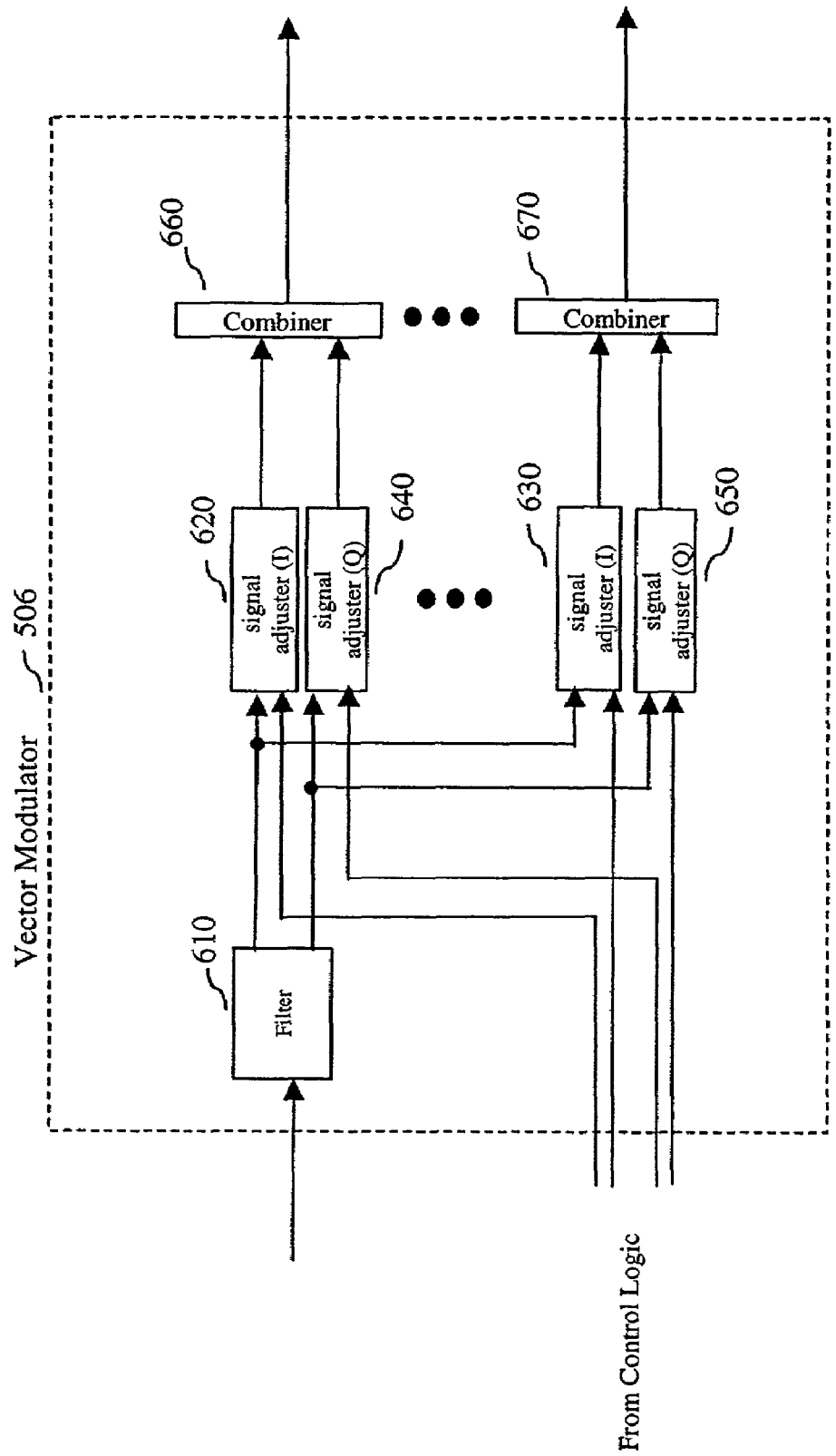
FIG. 6 shows an example of a system block diagram of the vector modulator, according to an embodiment of the invention.

FIG. 6 shows a system block diagram of the vector modulator shown in FIG. 5. Vector modulator 506 includes filter 610, in-phase signal adjusters 620 through 630, quadrature signal adjusters 640 through 650, and combiners 660 through 670.

The in-phase signal adjuster 620, the quadrature signal adjustor 640 and the combiner 660 are all uniquely associated with an antenna element from the set of antenna elements (not shown in FIG. 6). This set of components is repeated within vector modulator 506 corresponding to the number of remaining antenna elements for the subscriber communication device. Thus, as shown in FIG. 6, in-phase signal adjuster 630, quadrature signal adjuster 650 and combiner 670 are also shown for another antenna element of the subscriber communication device.

Filter 610 receives the digital pre-transmission signal from A/D converter 504. Filter 610 divides the received pre-transmission signal into in-phase and quadrature components. The in-phase component of the pre-transmission signal is provided to in-phase signal adjusters 620 through 630. The quadrature component of the pre-transmission signal is provided to quadrature signal adjusters 640 through 650. In-phase signal adjusters 620 through 630 and quadrature signal adjusters 640 through 650 receive complex weighting values from control logic 502. In-phase signal adjusters 620 through 630 and quadrature signal adjusters 640 through 650 apply the complex weighting to the pre-transmission signal components to produce modified pre-transmission signals. In-phase signal adjusters 620 through 630 and quadrature signal adjusters 640 through 650 provide modified pre-transmission signals to combiners 660 and 670, respectively. Combiners 660 and 670 then add the respective modified pre-transmission signals and forward the added signals to D/A converters 508 and 509, respectively.

Figure 7:
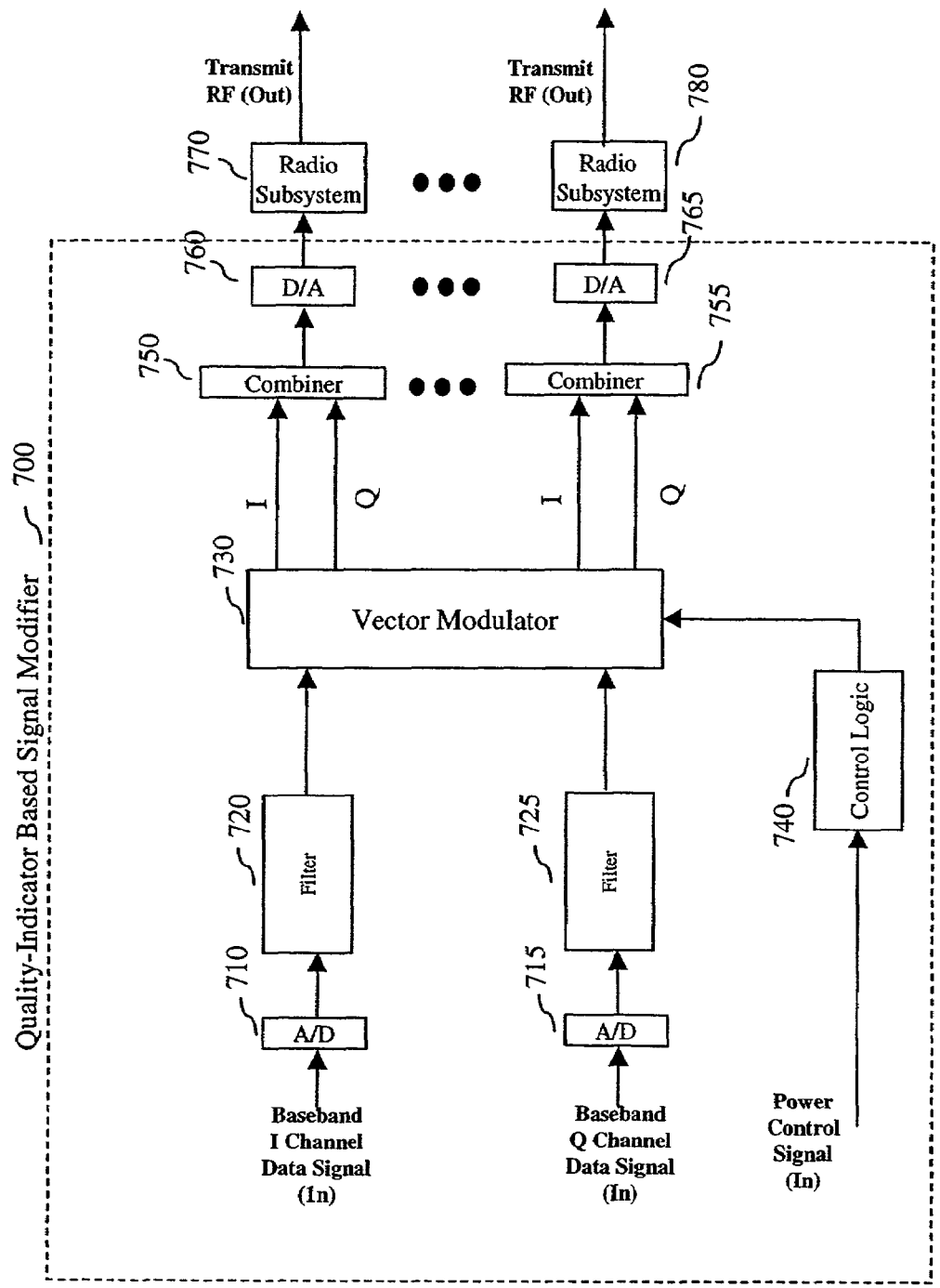
FIG. 7 shows a portion of the transmitter for the subscriber communication device according to another embodiment of the invention.

FIG. 7 shows a portion of the transmitter for the subscriber communication device according to another embodiment of the invention. The transmitter portion shown in FIG. 7 receives analog baseband signals (labeled in FIG. 7 as "Baseband I Channel Data Signal (In)" and "Baseband Q Channel Data Signal (In)") into a quality-indicator signal modifier 700.

Quality-indicator based signal modifier 700 includes A/D converters 710 and 715, filters 720 and 725, vector modulator 730, control logic 740, combiners 750 and 755, and D/A converters 760 and 765. D/A converters 760 and 765 of quality-indicator signal modifier 700 are coupled to radio subsystem 770 and 780, respectively.

A/D converter 710 receives the baseband in-phase signal. A/D converter 715 receives the baseband quadrature pre-transmission signal. AID converters 710 and 715 are coupled to filters 720 and 725, respectively, which are in turn coupled to vector modulator 730. Control logic 740 receives the power-control signal and forwards complex weighting values to modulator 730. Vector modulator 730 is coupled to combiners 750 through 755.

Combiner 755, D/A converter 760 and radio subsystem 770 uniquely correspond to a given antenna element from the set of antenna elements for the subscriber communication device (not shown in FIG. 7). This set of components is also present corresponding to the number of antenna elements for the subscriber communication device. Consequently, combiner 755, D/A converter 765 and radio subsystem 780 are also shown corresponding to a different antenna element from the set of antenna elements. Any number of additional sets of components can be present corresponding to the number of antenna elements.

Figure 8:
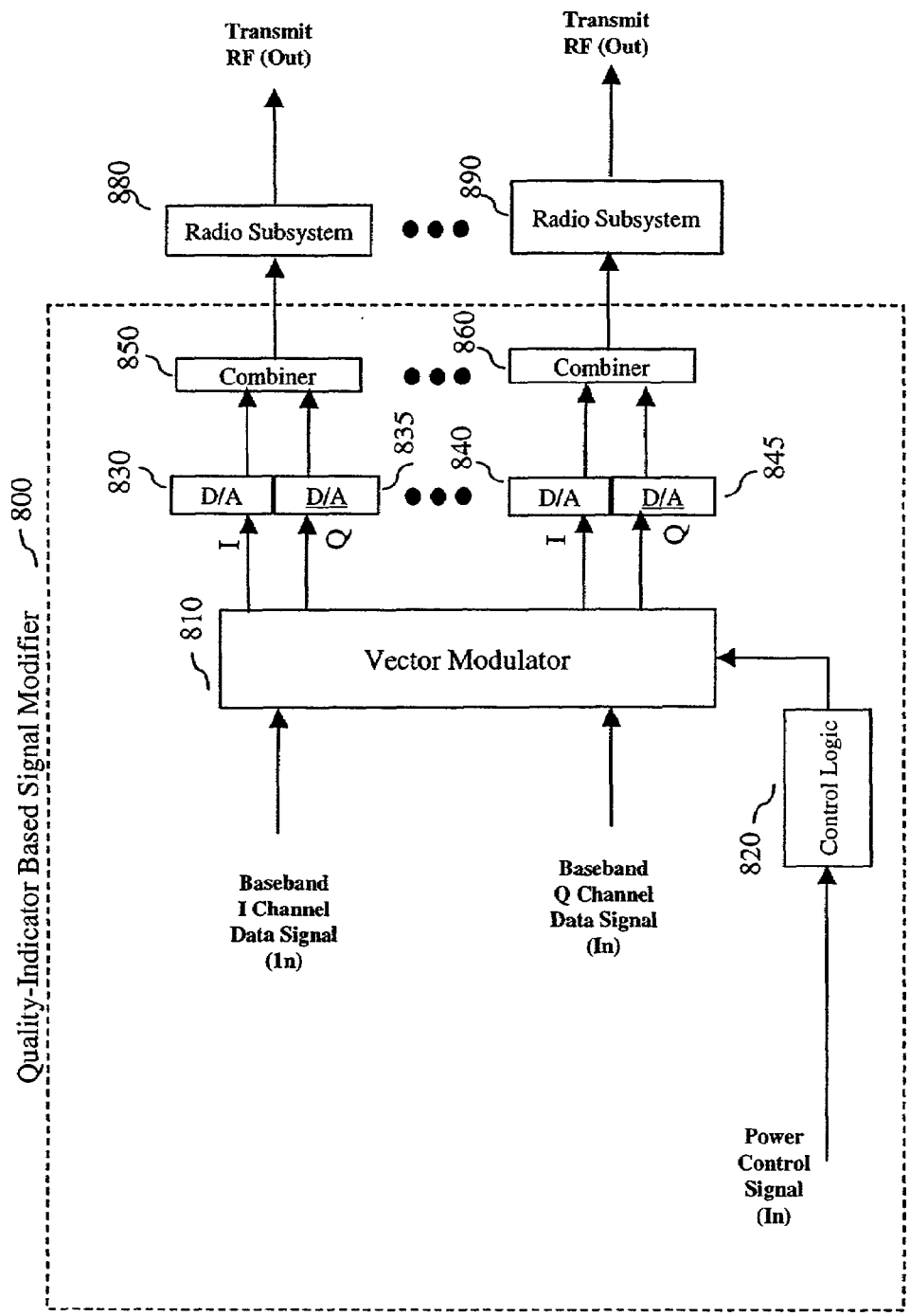
FIG. 8 shows a transmitted portion of a subscriber communication device according to yet another embodiment of the invention.

FIG. 8 shows a transmitter portion of a subscriber communication device according to yet another embodiment of the invention. More specifically, FIG. 8 shows a quality-indicator signal modifier that receives baseband digital signals.

Quality-indicator based signal modifier 800 includes vector modulator 810, control logic 802, D/A converters 830, 835, 840 and 845, and combiners 850 and 860. Combiners 850 and 860 of quality-indicator based signal modifier 800 are coupled to radio subsystems 870 and 880, respectively.

Control logic 820 receives a power-control signal and produces complex weighting values, which are provided to vector modulator 810. Vector modulator 810 also receives a digital baseband in-phase pre-transmission signal and a digital baseband quadrature pre-transmission signal. Vector modulator 810 splits the in-phase and quadrature pre-transmission signal components into a number of signals that correspond to the number of antenna elements for the subscriber communication device. The complex weighting values are then applied to the in-phase and quadrature pre-transmission signal associated for each antenna element from the set of antenna elements for the subscriber communication device to produce modified pre-transmission signals. These modified pre-transmission signals are then provided to D/A converters 830 through 845, which convert the digital form of the modified pre-transmission signals into analog form and forward these pre-transmission signals to combiners 850 and 860, respectively. Combiner 850 receives the in-phase and quadrature components of the modified pre-transmission signals from D/A converters 830 and 835, respectively. Combiner 850 adds these two signals and forwards the added signal to radio subsystem 870. Similarly, combiner 860 receives the analog in-phase and quadrature signal components of the modified pre-transmission signals from D/A converters 840 and 850, respectively and adds the signals. Combiner 860 adds these two signals and forwards the added signals to radio subsystem 880.

Figure 9:
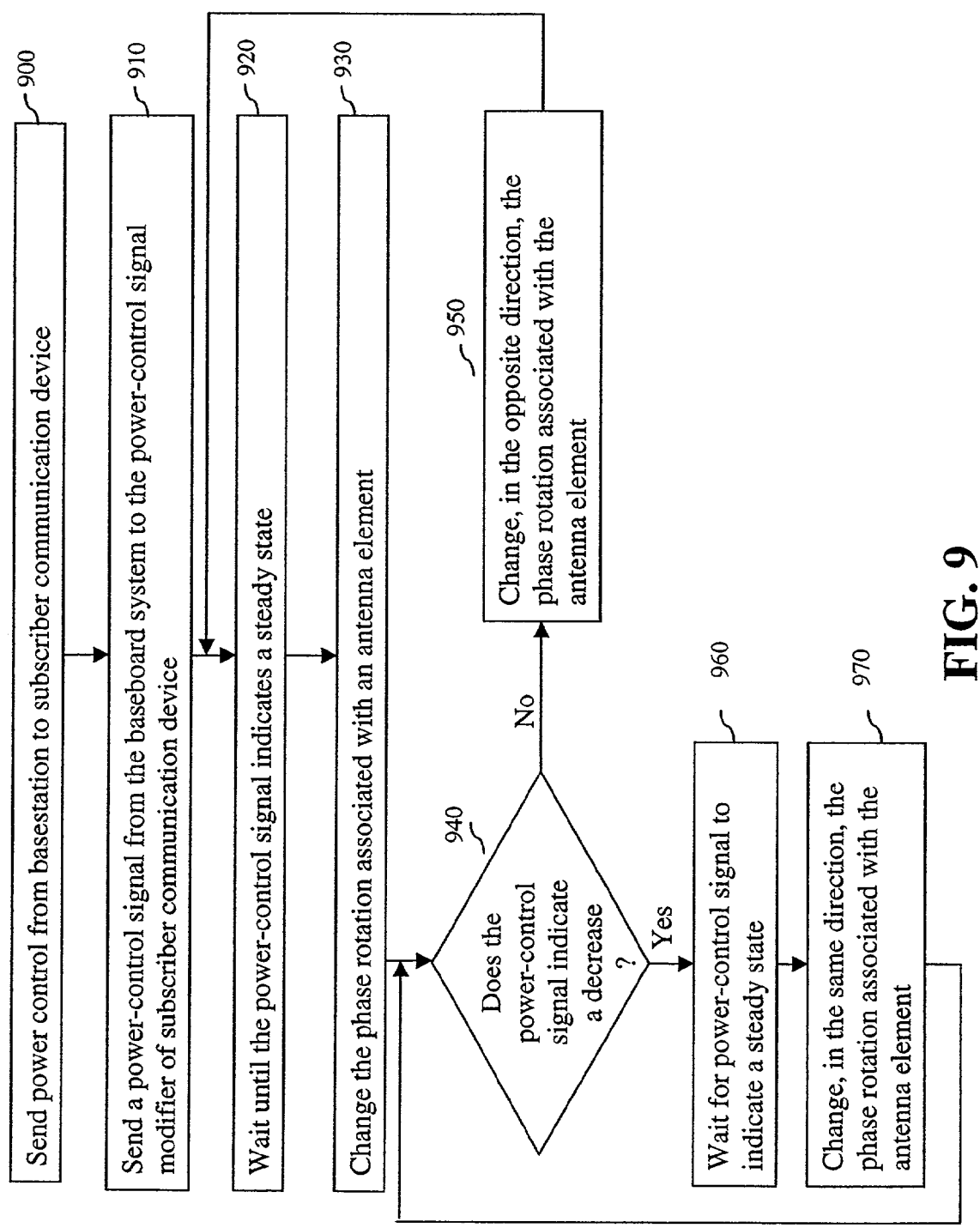
FIG. 9 shows a flowchart for calculating the complex weighting by adjusting the phase rotation associated with each antenna element, according to one embodiment.

FIG. 9 shows a flowchart for calculating the complex weighting by adjusting the phase rotation associated with each antenna element, according to an embodiment. Although FIG. 9 will be described in reference to FIGS. 1, 5 and 6 for convenience, the method described in reference to FIG. 9 can be used with any configuration of a subscriber communication device. In addition, although the quality-indication signal can be any appropriate type of signal that provides information to the subscriber communication device on the quality of the signal, for convenience of discussion, the quality-indication signal is assumed be to power-control signal according to the CDMA protocol.

At step 900, a power-indication signal is sent from basestation 110 to subscriber communication device 120 via wireless connection 130. At step 910, the power-control signal is sent from the baseband subsystem 121 to the quality-indicator based signal modifier 122 (also shown as quality-indicator based signal modifier 500 in FIG. 5). The power-control signal according to the CDMA protocol indicates one of two possible values for any given time period: an "up" value or a "down" value. An "up" value represents an indication from the basestation to the subscriber communication device that the subscriber communication device should increase the total power of its transmitted signal. A "down" value represents an indication from the basestation to the subscriber communication device that the subscriber communication device should decrease the total power of its transmitted signal. The particular value of the power-control signal is also referred to herein as including a power-control bit, which represents either the up or down values in binary form.

At step 920, the process is held until the power-control signal reaches a steady state. The power-control signal can reach a steady state in a number of ways. For example, a consecutive sequence of power-control signals of up-down-up or down-up-down. Once the power-control signal reaches a steady state, the process proceeds to step 930.

At step 930, the phase rotation associated with one antenna element is adjusted. Returning to FIGS. 5 and 6, control logic 502 calculates a new complex weighting so that the phase rotation for one antenna element is changed. This complex weighting is provided to the signal adjusters for that antenna element (e.g., signal adjusters 620 and 640, or signal adjusters 630 and 650). Upon receiving the complex weighting, these signal adjusters adjust the phase rotation thereby modifying the signal component sent from that antenna element and, consequently, modifying the total power of the transmitted signal.

At conditional step 940, the control logic 502 determines whether the power-control signal for a subsequent time period indicates a decrease, e.g., represented by a down value. If the power-control signal indicates a decrease, then the adjustment to the phase rotation for the one antenna element resulted in the basestation receiving the transmitted signal more optimally. In other words, because the basestation received the transmitted signal with increased total power, the basestation will send a down indication in a subsequent power-control signal. The subscriber communication device can continue to attempt to optimize the phase rotation for that antenna element and simultaneously reduce the total power of the transmitted signal. The total power of the transmitted signal can be reduced because the subscriber communication device is communicating with the basestation in a more optimal manner.

At conditional step 940, if the power-control signal does not indicate a decrease for the total power of the transmitted signal (e.g., the power-control signal indicates an up value), then the phase rotation adjustment was not effective and the process proceeds to step 950. At step 950, logic control 502 changes the phase rotation associated with that antenna element to the opposite direction. Then, the process proceeds to step 920 where steps 920 through 940 are repeated based on the opposite direction for the phase rotation.

At conditional step 940, if the power-control signal indicates a decrease for the total power of the transmitted signal (e.g., the power-control signal indicates a down value), then the phase rotation adjustment was effective and the process proceeds to step 960. At step 960, the process is held until the power-control signal reaches a steady state. At step 970, logic control 502 changes the phase rotation associated with that antenna element to the same direction. Then, the process proceeds to step 920 where steps 920 through 940 are repeated based on the same direction for the phase rotation.

Figure 10:
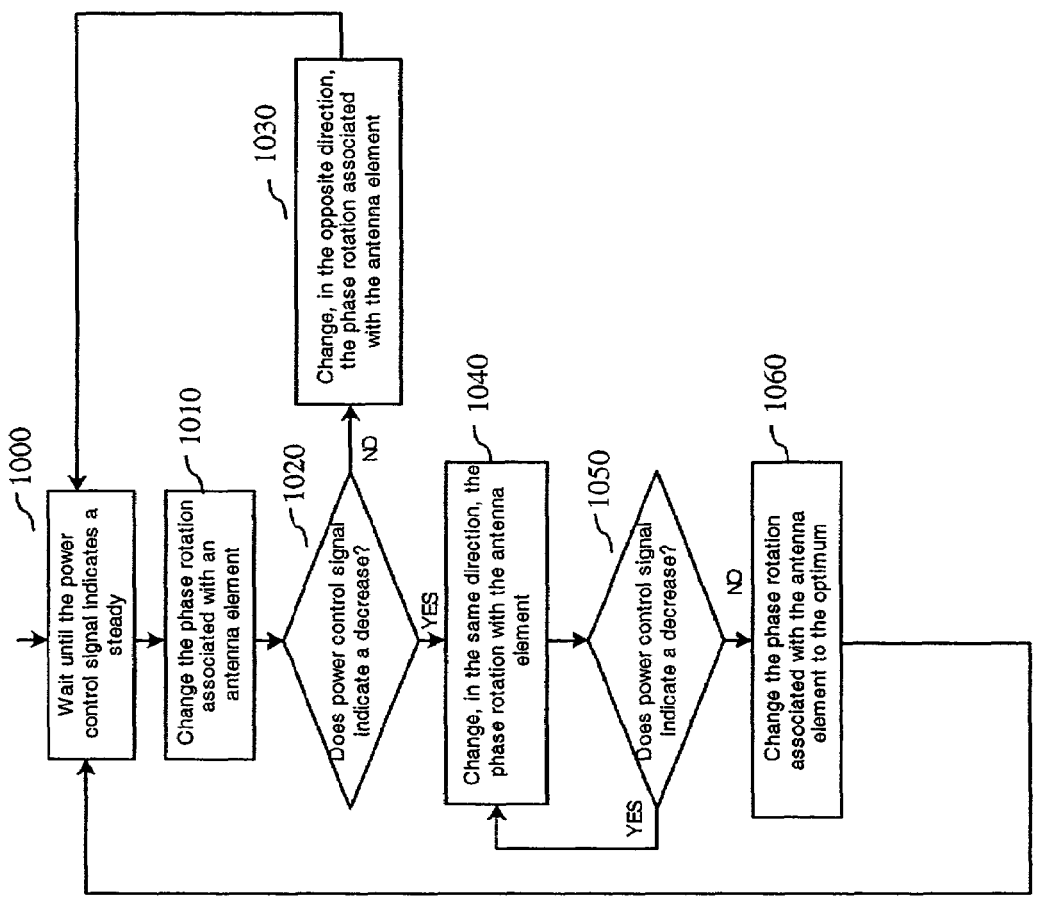
FIG. 10 shows a flowchart for calculating the complex weighting by adjusting the phase rotation associated with each antenna element, according to another embodiment.

FIG. 10 shows a flowchart for calculating the complex weighting by adjusting the phase rotation associated with each antenna element, according to yet another embodiment. At step 1000, the process is held until the power-control signal reaches a steady state. Once the power-control signal reaches a steady state, the process proceeds to step 1010. At step 1010, the phase rotation associated with one antenna element is adjusted based of a new complex weighting calculated by control logic 502.

At conditional step 1020, the control logic 502 determines whether the power-control signal for a subsequent time period indicated a decrease for the total power of the transmitted power, e.g., represented by a down value. If the power-control signal indicates a decrease, then the adjustment to the phase rotation for the one antenna element resulted in the basestation receiving the transmitted signal more optimally. Consequently, the selected direction for the phase rotation is correct and further adjustments to the phase rotation in the same direction may result in a further optimized transmitted signal.

At conditional step 1020, if the power-control signal does not indicate a decrease for the total power of the transmitted signal (e.g., the power-control signal indicates an up value), then the phase rotation adjustment was not effective and the process proceeds to step 1030. At step 1030, logic control 502 changes the phase rotation associated with that antenna element to the opposite direction. Then, the process proceeds to step 1000 where steps 1000 through 1020 are repeated based on the opposite direction for the phase rotation.

At step 1040, logic control 502 changes the phase rotation associated with that antenna element in the same direction. At conditional step 1050, the control logic 502 determines whether the power-control signal for a subsequent time period indicated a decrease, e.g., represented by a down value. If the power-control signal indicates a decrease, then the adjustment to the phase rotation was effective and again process proceeds to 1040. Steps 1040 and 1050 are repeated until the control logic 502 determines that the power-control signal for a subsequent time period indicates an increase for the total power of the transmitted power. At this point, the optimum phase rotation can be obtained by taking the average of the phase rotations during step 1040 and the process proceeds to step 1060. At step 1060, the phase rotation for the antenna element is returned to the previous optimal phase rotation value. Then, the process proceeds to step 1000 where the process is repeated for another antenna element. In this manner, the process can be repeated for each antenna element to obtain an overall optimum for the multiple antenna elements.

Figure 11:
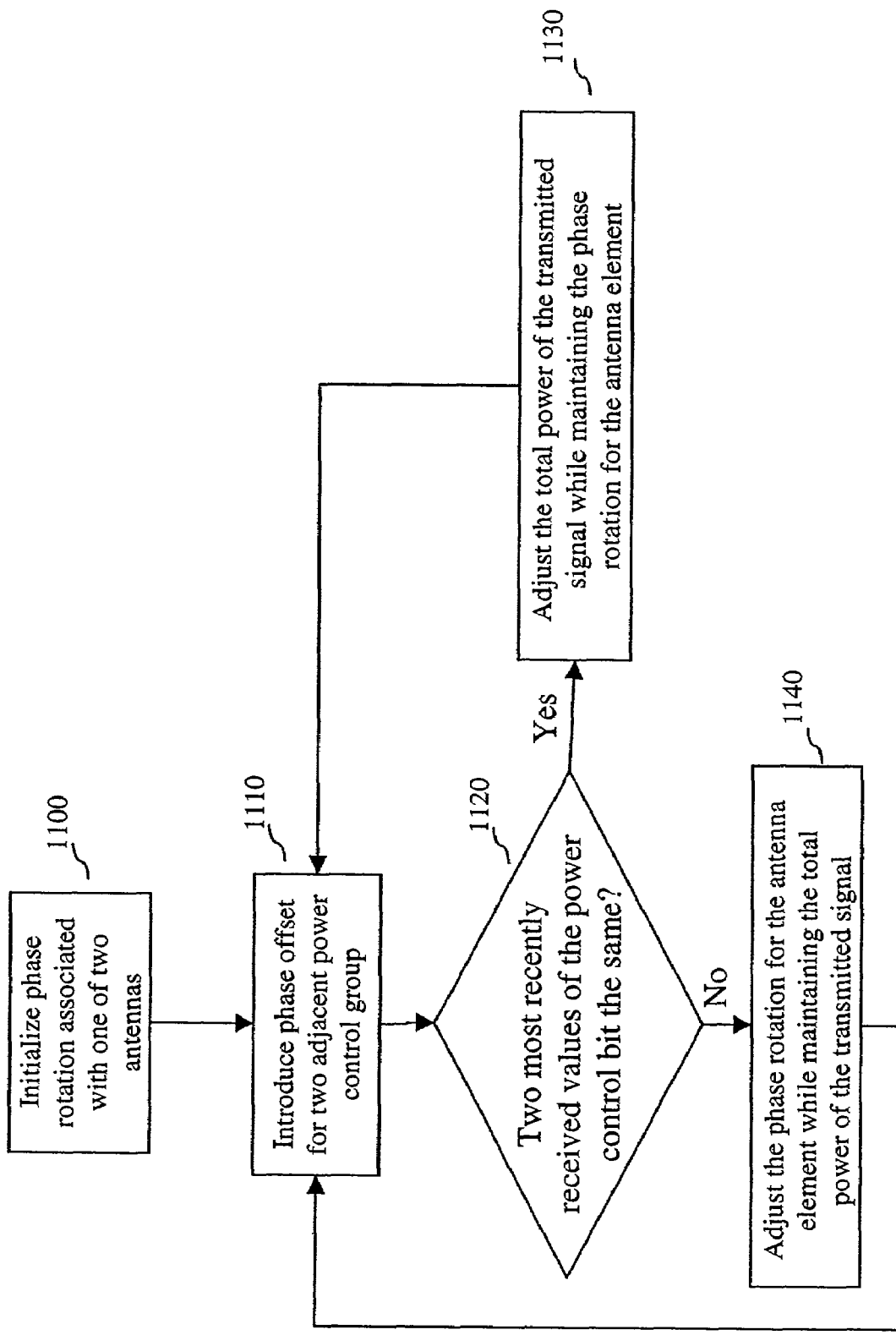
FIG. 11 shows a flowchart for calculating the complex weighting by adjusting the phase rotation associated with each antenna element, according to yet another embodiment.

FIG. 11 shows a flowchart for calculating the complex weighting by adjusting the phase rotation associated with each antenna element, according to another embodiment. FIG. 11 describes a method where the two most recently received values for the power-control bits are used to determine the proper phase rotation, and consequently, the proper complex weighting.

In this embodiment, the subscriber communication device using the CDMA protocol sends a signal of two adjacent power control groups (PCGs) in such a manner that the power associated with both PCGs are at the same level P. To simplify this discussion, assume for this embodiment that the subscriber communication device has two antenna elements, although any number of multiple antenna elements is possible. The phase rotation of the second antenna element relative to the first antenna element in the first PCG is Phi. The phase rotation of the second antenna element relative to the first antenna element in the second PCG is Phi+Delta.

The phase rotation offset (referred to as "Delta") introduced between the first and second PCG provides a mechanism to determine the direction of the phase rotation between the two antenna elements that will improve the signal quality received at the basestation. Consequently, the complex weighting can be calculated by the following: if the value of the power-control bit for the most recent time period corresponds to the value of the power-control bit for the second most recent time period, the total power of the transmitted signal is adjusted while maintaining the phase rotation of the two antenna elements (i.e., maintaining Phi); if the value of the power-control bit for the most recent time period differs from the value of the power-control bit for the second time period, phase rotation of the two elements (i.e., Phi) is adjusted while maintaining the total power of the transmitted signal. The following more fully discusses this embodiment.

At step 1100, a phase rotation associated with one of the two antenna elements is initialized. At step 1110, phase rotation offset (also referred to above as Delta) is introduced for two adjacent PCGs. Based on this introduced phase rotation offset, a transmitted signal is sent from the subscriber communication device to the basestation. Then, the basestation sends a power-control signal based on this received transmitted signal.

At conditional step 1120, a determination is made as to whether the two most recently received values for the power-control bit are same. In other words, the power-control bit will have a particular value for each time period. For example, this time period for the CDMA and the WCDMA protocols is 1.25 msec and 666 μsec, respectively. The determination at step 1120 compares the value for the power-control bit at the most recent time period to the value for the power-control bit at the second most recent time period. If the two values for the power-control bit correspond, the process proceeds to step 1130. If the two values for the power-control bit differ, the process proceeds to step 1140.

At step 1130, the total power of the transmitted signal is adjusted while maintaining the phase rotation for the antenna element. Control logic 502 adjusts the total power of the transmitted signal and maintains the phase rotation for the two antenna elements by appropriately calculating new complex weighting. Then, the process proceeds to step 1110 so that the process is repeated.

At step 1140, the phase rotation for the two antenna elements is adjusted while maintaining total power of the transmitted signal. Control logic 502 adjusts the phase rotation for the antenna and maintains the total power of the transmitted signal by appropriately calculating new complex weighting. Then, the process proceeds to step 1110 so that the process is repeated.

In this manner, the two most recently received values for the power-control bits are used to determine the proper phase rotation, and consequently, a proper complex weighting. Although the total power of the transmitted signal is adjusted according to this embodiment, the power ratios of the respective antenna elements are not adjusted. The embodiments discussed below in connection with FIGS. 12 and 13 address the calculation of complex weighting so that the total power of the transmitted signal, the phase rotation and the power ratio of the antenna elements are adjusted.

Figure 12:
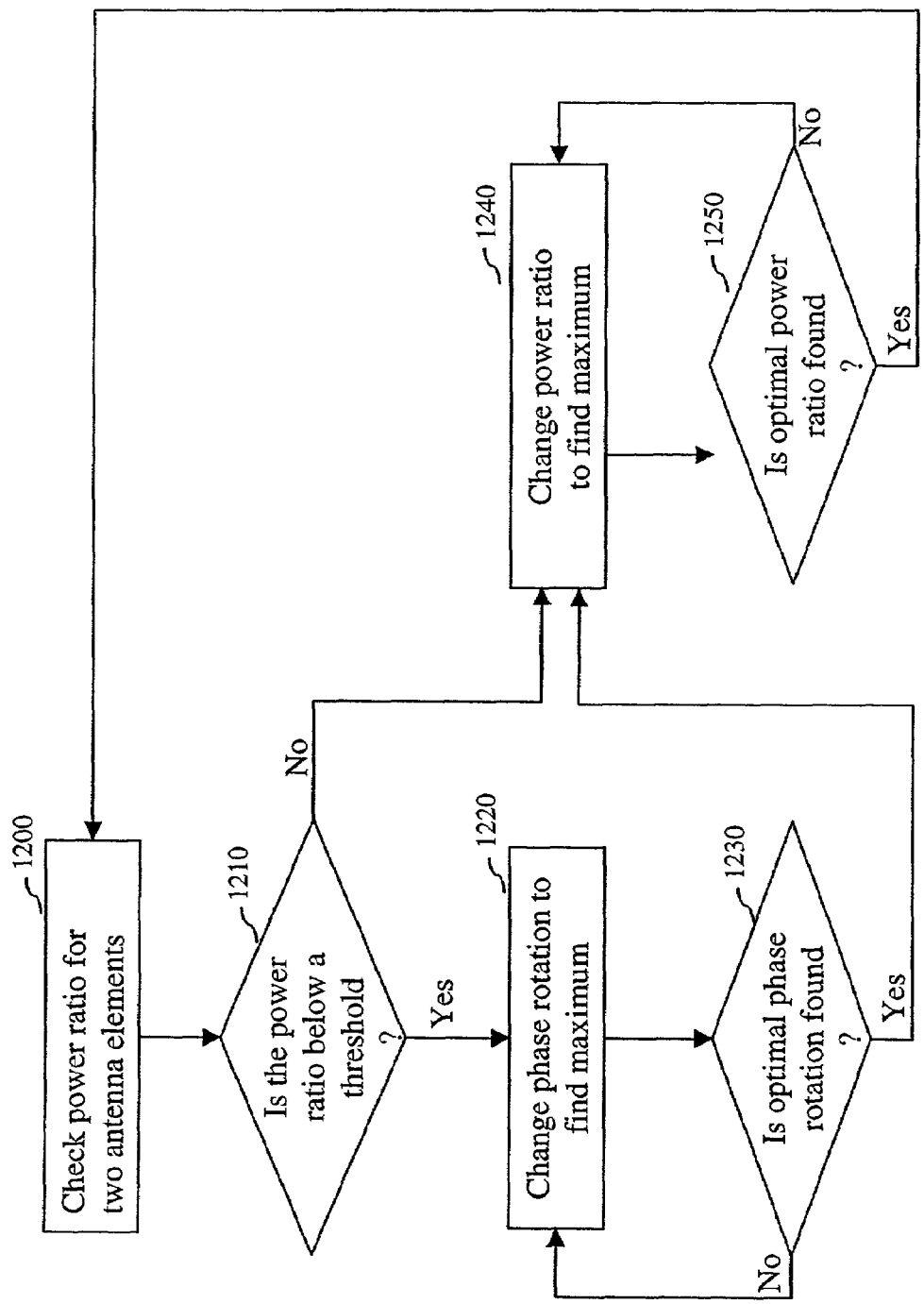
FIG. 12 shows a flowchart for calculating the complex weighting by adjusting the power ratio and the phase rotation associated with each antenna element, according to an embodiment of the invention.

FIG. 12 shows a flowchart for calculating the complex weighting by adjusting the power ratio and the phase rotation associated with each antenna element, according to an embodiment of the invention. In this embodiment, an element threshold detection is considered before adjusting any phase rotation or power ratio for the antenna elements. Again, to simplify this discussion, assume for this embodiment that the subscriber communication device has two antenna elements, although any number of multiple antenna elements is possible. By checking the ratio of the antenna elements, the basestation can provide feedback using the power-control bit of the power-control signal.

More specifically, based on the threshold values, the phase rotation can be adjusted to converge on a substantially optimal phase rotation value. Having determined the substantially optimal phase rotation value, the power ratio value for the antenna elements can be calculated until a substantially optimal power ratio value is converged upon. The process is iterative and can be interrupted at any time to change any parameter, such as the phase rotation or the power ratio.

At step 1200, the power ratio for the two antenna elements is measured. At conditional step 1210, a determination is made as to whether the power ratio is below a predetermined threshold. If the power ratio is not below the predetermined threshold, then the process proceeds to step 1240. If the power ratio is below the predetermined threshold, then the process proceeds to step 1220 to tune the phase rotation.

At step 1220, the phase rotation is changed to find a maximum value. At conditional step 1230, the phase rotation is checked to determine whether it is a substantially optimal value. If the phase rotation is not a substantially optimal value, the process proceeds to step 1220 where the process for finding a substantially optimal value of the phase rotation continues. If the phase rotation is a substantially optimal value, then the process proceeds to step 1240.

At step 1240, the power ratio is changed to find a maximum value. At conditional step 1250, the power ratio is checked to determine whether it is a substantially optimal value. If the power ratio is not a substantially optimal value, the process proceeds to step 1240 where the process for finding a substantially optimal value of the power ratio continues. If the power ratio is a substantially optimal value, then the process proceeds to step 1200, where the overall process repeats.

In sum, the complex weighting can be calculated by adjusting the phase rotation associated with the antenna elements first, and then adjusting the power ratio associated with the antenna elements. In this manner, both the phase rotation and the power ratio can be adjusted to optimize substantially the transmitted signal sent from the subscriber communication device at received at the basestation.

Figure 13:
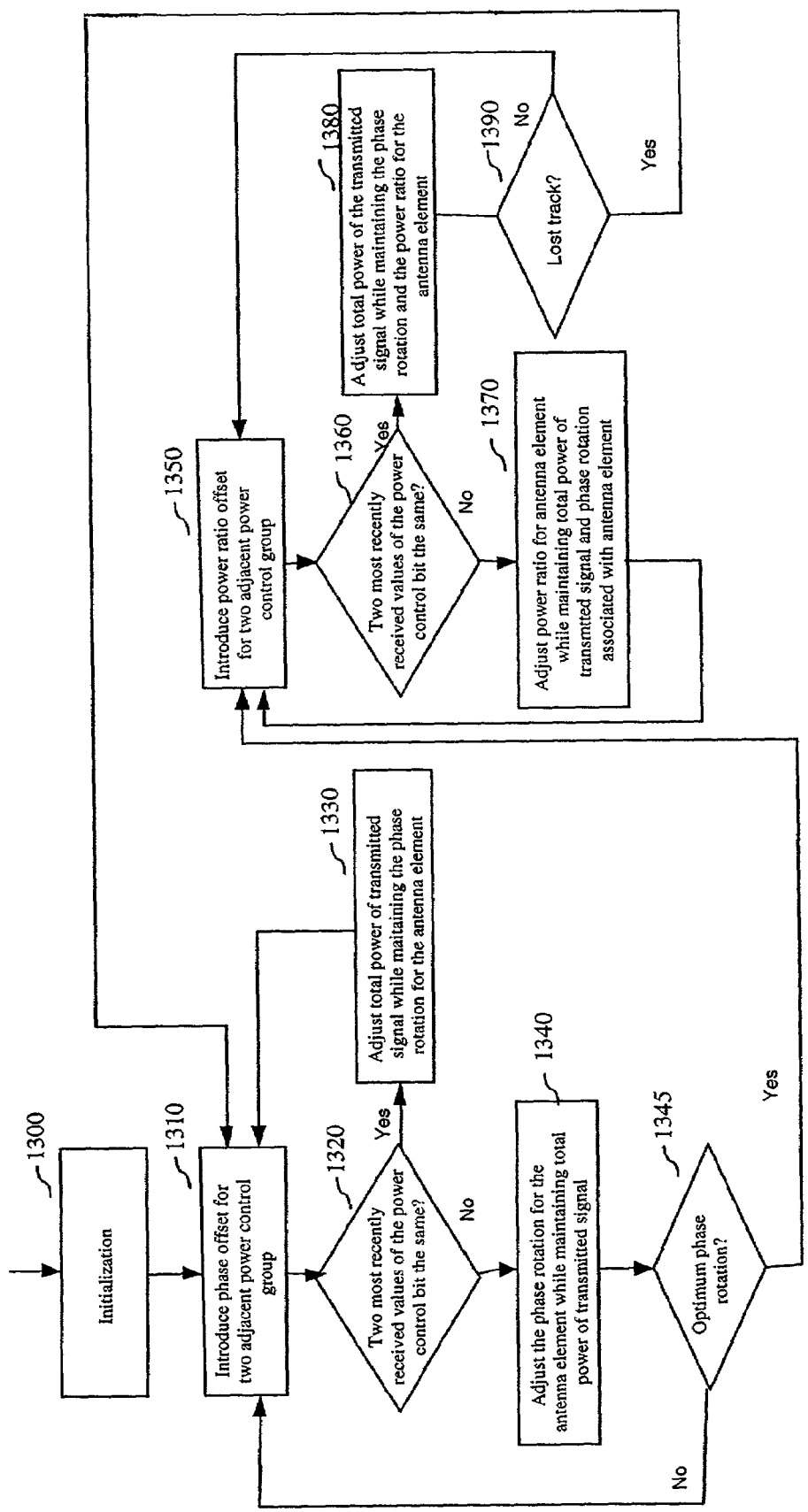
FIG. 13 shows a flowchart for calculating the complex weighting by adjusting the power ratio and the phase rotation associated with each antenna element, according to another embodiment of the invention.

FIG. 13 shows a flowchart for calculating the complex weighting by adjusting the power ratio and the phase rotation associated with each antenna element, according to another embodiment of the invention. Similar to FIG. 11, FIG. 13 describes a method where the two most recently received values for the power-control bit are used to determine the proper phase rotation. In FIG. 13, however, the power ratio associated with the two antenna elements is adjusted after the phase rotation associated with the second antenna element is adjusted. The process of adjusting the power ratio is similar to that described above for adjusting the phase rotation in reference to FIG. 11.

In this embodiment, the subscriber communication device using the CDMA protocol sends a signal of two adjacent power control groups (PCGs) in such a manner that the power associated with both PCGs are at the same level P. Again, to simplify this discussion, assume for this embodiment that the subscriber communication device has two antenna elements, although any number of multiple antenna elements is possible.

The power ratio associated with the first PCG between the first antenna element and the second antenna element is Lambda. The power ratio associated with the second PCG between the first antenna element and the second antenna element is Lambda+Zeta. The power ratio offset (i.e., Zeta) introduced between the first and second PCG provides a mechanism to determine the direction of changing power ration between the two antenna elements that will improve the signal quality received at the basestation. Consequently, the complex weighting can be calculated by the following: if the value of the power-control bit for the most recently received time period corresponds to the value of the power-control bit for the second most recently received time period, the total power of the transmitted signal is adjusted while maintaining the power ratio of the two antenna elements; if the value of the power-control bit for the most recently received time period differs from the value of the power-control bit for the second most recently received time period, power ratio Lambda is adjusting while maintaining the total power of the transmitted signal. The following more fully discusses this embodiment.

At step 1300, a phase rotation and a power ratio associated with one of the two antenna elements is initialized. At step 1310, phase rotation offset (also referred to above as Delta) is introduced for two adjacent PCGs. Based on this introduced phase rotation offset, a transmitted signal is sent from the subscriber communication device to the basestation. Then, the basestation sends a power-control signal based on this received transmitted signal.

At conditional step 1320, a determination is made as to whether the two most recently received values for the power-control bit are same. If the two values for the power-control bits correspond, the process proceeds to step 1330. If the two values for the power-control bits differ, the process proceeds to step 1340.

At step 1330, the total power of the transmitted signal is adjusted while maintaining the phase rotation for the antenna element. Control logic 502 adjusts the total power of the transmitted signal and maintains the phase rotation for the two antenna elements by appropriately calculating new complex weighting. Note that during this step the power ratio for the two antenna elements are also maintained. Then, the process proceeds to step 1310 so that the process is repeated.

At step 1340, the phase rotation for the two antenna elements is adjusted while maintaining total power of the transmitted signal. Control logic 502 adjusts the phase rotation for the antenna and maintains the total power of the transmitted signal by appropriately calculating new complex weighting. Note that during this step the power ratio for the two antenna elements are also maintained. Then, the process proceeds to conditional step 1345.

At conditional step 1345, a determination is made as to whether the adjusted phase rotation produced by step 1340 is optimal. If the phase rotation is less than substantially optimal, then the process proceeds to step 1310. If the phase rotation is substantially optimal, then the process proceeds to step 1350.

At step 1350, power ratio offset (also referred to above as Zeta) is introduced for two adjacent PCGs. At conditional step 1350, a determination is made as to whether the two most recently received values for the power-control bit correspond. If the two most recently received values for the power-control bit correspond, the process proceeds to step 1380. If the two most recently received values for the power-control bit differ, the process proceeds to step 1370.

At step 1370, the power ratio for the antenna element is adjusted while maintaining total power of the transmitted signal and maintaining the phase rotation for the two antenna elements. Control logic 502 adjusts the power ratio for the antenna and maintains the total power of the transmitted signal and the phase rotation for two antenna elements by appropriately calculating new complex weighting. The process then proceeds to step 1350 so that steps 1350 and 1360 are repeated until the two values for the most recently received values for the power-control bit correspond.

At step 1380, the power of the transmitted signal is adjusted while maintaining the power ratio and the phase rotation for the antenna element. Control logic 502 adjusts the total power of the transmitted signal and maintains the power ratio and the phase rotation for the antenna element by appropriately calculating new complex weighting. At conditional step 1390, a determination is made as to whether the track is lost. If the track is not lost, then the process proceeds to step 1350 so that the process of tuning the power ratio associated with the antenna element and the total power of the transmitted signal are repeated in steps 1350 through 1390.

Returning to conditional step 1390, if the track is lost, then the process proceeds to step 1310 where the process of optimizing the phase rotation and then the power ratio is repeated in steps 1310 through 1390.

CONCLUSION

While various embodiments of the invention have been described above, it should be understood that they have been presented by way of example only, and not limitation. Thus, the breadth and scope of the invention should not be limited by any of the above-described embodiments, but should be defined only in accordance with the following claims and their equivalents.

The previous description of the embodiments is provided to enable any person skilled in the art to make or use the invention. While the invention has been particularly shown and described with reference to embodiments thereof, it will be understood by those skilled in the art that various changes in form and details may be made therein without departing from the spirit and scope of the invention. For example, although the previous description of the embodiments often referred to communication devices using a CDMA protocol, other types of protocols are possible. For example, the communication devices similar to those described above can be used with time-division multiple access (TDMA) or frequency-division multiple access (FDMA) protocols. Such a TDMA protocol can include, for example, the Global Systems for Mobile Communications (GSM) protocol.

Note that although the tuning of a communication device is described through the use complex weighting, in other embodiments other types of control signals can tune the communication device. In other words, the tuning of a communication device through the use such control signals need not be limited to information about varying the magnitude and phase of the signal. For example, the control signals can carry information to vary the magnitude, phase, frequency and/or timing of the signal associated with each antenna element.

What is claimed is:

1. A method for a first communication device to communicate with a second communication device over a communication link, the first communication device having a plurality of antenna elements, the method comprising:

receiving a quality-indication signal from the second communication device, the communication link configured according to at least one Code-Division-Multiple-Access (CDMA) protocol from the group of CDMA-IS-95 A/B, CDMA 2000 1X/RTT, CDMA 2000 3X, CDMA EV-DO, WCDMA, 3G Universal Mobile Telecommunications System (UMTS) and 4G UMTS, the quality-indication signal being a power-control bit according to the CDMA protocol, the power-control bit having a value of one or zero for each time period from a plurality of time periods, the power-control bit being generated by the second communication device and indicating an adjustment to a power of a transmitted signal at the first communication device so that a predetermined threshold requirement for the second communication device can be satisfied;

calculating a complex weighting based on the quality-indication signal, the complex weighting being associated with a total power of the transmitted signal and at least one from a phase rotation and a power ratio associated with each antenna element from the plurality of antenna elements, the complex weighting associated with the total power of the transmitted signal and the phase rotation associated with each antenna element from the plurality of antenna elements, the calculating of the complex weighting being performed for each antenna element from the plurality of antenna elements and wherein said calculating includes:

adjusting the total power of the transmitted signal while maintaining the phase rotation associated with an antenna element from the plurality of antenna elements until a steady state is obtained at a first time;

adjusting the phase rotation associated with each antenna element from the plurality of antenna elements while maintaining the total power of the transmitted signal to produce an optimal phase rotation for each antenna element; and adjusting the total power of the transmitted signal while maintaining the optimal phase rotation for each antenna element until a second steady state is obtained at a second time subsequent to the first time;

modifying a pre-transmission signal based on the complex weighting to produce a plurality of modified pre-transmission signals, each modified pre-transmission signal from the plurality modified pre-transmission signals being uniquely associated with an antenna element from a plurality antenna elements; and sending the plurality of modified pre-transmission signals from the plurality of antenna elements to produce the effective combined transmitted signal.

2. A method for a first communication device to communicate with a second communication device over a communication link, the first communication device having a plurality, of antenna elements, the method comprising:

receiving a quality-indication signal from the second communication device, the communication link configured according to at least one Code-Division-Multiple-Access (CDMA) protocol from the group of CDMA-IS-95 A/B, CDMA 2000 1X/RTT, CDMA 2000 3X, CDMA EV-DO, WCDMA, 3G Universal Mobile Telecommunications System (UMTS) and 4G UMTS, the quality-indication signal being a power-control bit according to the CDMA protocol, the power-control bit having a value of one or zero for each time period from a plurality of time periods, the power-control bit being generated by the second communication device and indicating an adjustment to a power of a transmitted signal at the first communication device so that a predetermined threshold requirement for the second communication device can be satisfied, the plurality of antenna elements includes only a first antenna element and a second antenna element, the transmitted signal including a first adjacent power control group (PCG) and a second PCG so that a power associated with the first PCG and a power associated with the second PCG are substantially at a same level P, the first PCG being associated with its own phase rotation having a value, the second PCG being associated with its own phase rotation having the value of the first PCG plus an offset; and calculating a complex weighting based on the quality-indication signal, the complex weighting being associated with a total power of the transmitted signal and at least one from a phase rotation and a power ratio associated with each antenna element from the plurality of antenna elements, the complex weighting associated with the total power of the transmitted signal and the phase rotation associated with each antenna element from the plurality of antenna elements, the calculating of the complex weighting including:

adjusting the total power of the transmitted signal while maintaining the phase rotation associated with the first PCG and the phase rotation associated with the second PCG if the value for the power-control bit at the most recent time period corresponds to the value for the power-control bit at a second most recent time period; and adjusting the phase rotation associated with the first PCG and the phase rotation associated with the second PCG while maintaining the total power of the transmitted signal if the value for the power-control bit at the most recent time period differs from the value for the power-control bit at the second most recent time period;

modifying a pre-transmission signal based on the complex weighting to produce a plurality of modified pre-transmission signals, each modified pre-transmission signal from the plurality modified pre-transmission signals being uniquely associated with an antenna element from a plurality antenna elements; and sending the plurality of modified pre-transmission signals from the plurality of antenna elements to produce the effective combined transmitted signal.

3. The method of claim 2, wherein:

the total power of the transmitted signal is optimized with respect to a fading associated with a channel between the first communication device and the second communication device.

4. The method of claim 2, wherein the calculating of the complex weighting includes:

substantially optimizing the total power of the transmitted signal and the phase rotation associated with each antenna element from the plurality of antenna elements in parallel while maintaining a power ratio associated with each antenna element from the plurality of antenna elements.

5. The method of claim 2, wherein the calculating of the complex weighting includes:

detecting a steady state in the quality-indication signal;

adjusting the phase rotation associated with the second antenna element;

selecting a first direction for the phase rotation associated with the second antenna element, the first direction being selected to improve a received signal quality at the second communication device; and adjusting the phase rotation associated with the second antenna element in the first direction until a boundary is detected.

6. The method of claim 2, wherein the calculating of the complex weighting includes:

detecting a steady state in the quality-indication signal at a first time;

adjusting the phase rotation associated with the second antenna element;

selecting a first direction for the phase rotation associated with the second antenna element, the first direction being selected to improve a received signal quality at the second communication device; and adjusting the phase rotation associated with the second antenna element in the first direction until a second steady state is detected in the quality-indication signal at a second time subsequent to the first time.

7. The method of claim 2, wherein:

the quality-indication signal includes a first frame quality indicator according to the CDMA protocol.

8. The method of claim 2, wherein:
the first communication device is a subscriber communication device; and
the second communication device is a basestation.

9. The method of claim 2, wherein:
the first communication device is a basestation; and
the second communication device is a subscriber communication device.

10. A method for a first communication device to communicate with a second communication device over a communication link, the first communication device having a plurality of antenna elements, the method comprising:
receiving a quality-indication signal from the second communication device, the communication link configured according to at least one Code-Division-Multiple-Access (CDMA) protocol from the group of CDMA-IS-95 A/B, CDMA 2000 1X/RTT, CDMA 2000 3X, CDMA BY-DO, WCDMA, 3G Universal Mobile Telecommunications System (UMTS) and 4G UMTS, the quality-indication signal being a power-control bit according to the CDMA protocol, the power-control bit having a value of one or zero for each time period from a plurality of time periods, the power-control bit being generated by the second communication device and indicating an adjustment to a power of a transmitted signal at the first communication device so that a predetermined threshold requirement for the second communication device can be satisfied;
calculating a complex weighting based on the quality-indication signal, the complex weighting being associated with a total power of the transmitted signal and at least one from a phase rotation and a power ratio associated with each antenna element from the plurality of antenna elements;
modifying a pre-transmission signal based on the complex weighting to produce a plurality of modified pre-transmission signals, each modified pre-transmission signal from the plurality modified pre-transmission signals being uniquely associated with an antenna element from a plurality antenna elements; and
sending the plurality of modified pre-transmission signals from the plurality of antenna elements to produce the effective combined transmitted signal, wherein the calculating of the complex weighting includes:
substantially optimizing the total power of the transmitted signal and the phase rotation associated with each antenna element from the plurality of antenna elements in parallel while maintaining a power ratio associated with each antenna element from the plurality of antenna elements; and
substantially optimizing the total power of the transmitted signal and a power ratio associated with each antenna element from the plurality of antenna elements in parallel while maintaining the phase rotation associated with each antenna element from the plurality of antenna elements.

11. A method for a first communication device to communicate with a second communication device over a communication link, the first communication device having a plurality of antenna elements, the method comprising:
receiving a quality-indication signal from the second communication device, the communication link configured according to at least one Code-Division-Multiple-Access (CDMA) protocol from the group of CDMA-IS-95 A/B, CDMA 2000 1X/RTT, CDMA 2000 3X, CDMA EV-DO, WCDMA, 3G Universal Mobile Telecommunications System (UMTS) and 4G UMTS, the quality-indication signal being a power-control bit according to the CDMA protocol, the power-control bit having a value of one or zero for each time period from a plurality of time periods, the power-control bit being generated by the second communication device and indicating an adjustment to a power of a transmitted signal at the first communication device so that a predetermined threshold requirement for the second communication device can be satisfied;
calculating a complex weighting based on the quality-indication signal, the complex weighting being associated with a total power of the transmitted signal and at least one from a phase rotation and a power ratio associated with each antenna element from the plurality of antenna elements;
modifying a pre-transmission signal based on the complex weighting to produce a plurality of modified pre-transmission signals, each modified pre-transmission signal from the plurality modified pre-transmission signals being uniquely associated with an antenna element from a plurality antenna elements; and
sending the plurality of modified pre-transmission signals from the plurality of antenna elements to produce the effective combined transmitted signal, wherein the calculating of the complex weighting includes:
adjusting the total power of the transmitted signal while maintaining the phase rotation and the power ratio associated with each antenna element from the plurality of antenna elements until a steady state is detected in the quality-indication signal;
adjusting the phase rotation associated with each antenna element from the plurality of antenna elements while maintaining the total power of the transmitted signal and a power ratio associated with each antenna element from the plurality of antenna elements;
adjusting a total power of the transmitted signal while maintaining the phase rotation and the power ratio associated with each antenna element from the plurality of antenna elements;
adjusting the power ratio associated with each antenna element from the plurality of antenna elements while maintaining the total power associated with the transmitted signal and the phase rotation associated with each antenna element from the plurality of antenna elements; and
adjusting the total power of the transmitted power while maintaining the phase rotation and the power ratio associated with each antenna element from the plurality of antenna elements.

12. The method of claim 11, wherein the plurality of antenna elements is a first antenna element and a second antenna element and wherein:
the transmitted signal includes a first adjacent power control group (PCG) and a second PCG so that a power associated with the first PCG and a power associated with the second PCG are substantially at a same level P, the first PCG being associated with its own phase rotation having a value and its own power ratio having a value, the second PCG being associated with its own phase rotation having the phase rotation value of the first PCG plus a phase offset and its own power ratio having the power ratio value of the first PCG plus a power ratio offset; and
the calculating of the complex weighting includes:
adjusting the total power of the transmitted signal while maintaining the phase rotation associated with the first PCG and the phase rotation associated with the second PCG if the value for the power-control bit at the most recent time period corresponds to the value for the power-control bit at a second most recent time period;

adjusting the phase rotation associated with the first PCG and the phase rotation associated with the second PCG while maintaining the total power of the transmitted signal if the value for the power-control bit at the most recent time period differs from the value for the power-control bit at the second most recent time period;

adjusting the total power of the transmitted signal while maintaining the power ratio associated with the first PCG and the power ratio associated with the second PCG if the value for the power-control bit at the most recent time period corresponds to the value for the power-control bit at the second most recent time period; and adjusting the power ratio associated with the first PCG and the power ratio associated with the second PCG while maintaining the total power of the transmitted signal if the value for the power-control bit at the most recent time period differs from the value for the power-control bit at the second most recent time period.

13. The method of claim 12, wherein: the calculating of the complex weighting includes:

adjusting the total power of the transmitted signal while maintaining the phase rotation associated with the first PCG and the phase rotation associated with the second PCG and while maintaining the power ratio associated with the first PCG and the power ratio associated with the second PCG.

14. The method of claim 11, wherein the plurality of antenna elements is a first antenna element and a second antenna element and wherein the calculating of the complex weighting includes:

adjusting the phase rotation associated with each antenna element from the plurality of antenna elements while maintaining the total power of the transmitted signal and a power ratio associated with each antenna element from the plurality of antenna elements;

after adjusting the phase rotation, adjusting the power ratio associated with each antenna element from the plurality of antenna elements while maintaining the total power associated with the transmitted signal and the phase rotation associated with each antenna element from the plurality of antenna elements.

15. A method for a first communication device to communicate with a second communication device over a communication link, the first communication device having a plurality of antenna elements, the method comprising:

receiving a quality-indication signal from the second communication device, the communication link configured according to at least one Time Division Multiple Access (TDMA) protocol;

calculating a complex weighting based on the quality-indication signal, the complex weighting being associated with a total power of a transmitted signal and at least one from a phase rotation and a power ratio associated with each antenna element from the plurality of antenna elements, the calculating of the complex weighting being performed for each antenna element from the plurality of antenna elements and including:

adjusting the total power of the transmitted signal while maintaining the phase rotation associated with an antenna element from the plurality of antenna elements until a steady state is obtained at a first time;

adjusting the phase rotation associated with each antenna element from the plurality of antenna elements while maintaining the total power of the transmitted signal to produce an optimal phase rotation for each antenna element; and adjusting the total power of the transmitted signal while maintaining the optimal phase rotation for each antenna element until a second steady state is obtained at a second time subsequent to the first time;

modifying a pre-transmission signal based on the complex weighting to produce a plurality of modified pre-transmission signals, each modified pre-transmission signal from the plurality modified pre-transmission signals being uniquely associated with an antenna element from a plurality antenna elements; and sending the plurality of modified pre-transmission signals from the plurality of antenna elements to produce an effective combined transmitted signal.

16. The method of claim 15, wherein:

the complex weighting is associated with the total power of the transmitted signal and the phase rotation associated with each antenna element from the plurality of antenna elements, but not the power ratio associated with each antenna element from the plurality of antenna elements.

17. The method of claim 15, wherein the calculating of the complex weighting includes:

substantially optimizing the total power of the transmitted signal and the phase rotation associated with each antenna element from the plurality of antenna elements in parallel while maintaining a power ratio associated with each antenna element from the plurality of antenna elements.

18. A method for a first communication device to communicate with a second communication device over a communication link, the first communication device having a plurality of antenna elements, the method comprising:

receiving a quality-indication signal from the second communication device, the communication link is configured according to at least one frequency division multiple access (FDMA) protocol;

calculating a complex weighting based on the quality-indication signal, the complex weighting being associated with a total power of a transmitted signal and at least one from a phase rotation and a power ratio associated with each antenna element from the plurality of antenna elements, the calculating of the complex weighting being performed for each antenna element from the plurality of antenna elements and including:

adjusting the total power of the transmitted signal while maintaining the phase rotation associated with an antenna element from the plurality of antenna elements until a steady state is obtained at a first time;

adjusting the phase rotation associated with each antenna element from the plurality of antenna elements while maintaining the total power of the transmitted signal to produce an optimal phase rotation for each antenna element; and adjusting the total power of the transmitted signal while maintaining the optimal phase rotation for each antenna element until a second steady state is obtained at a second time subsequent to the first time;

modifying a pre-transmission signal based on the complex weighting to produce a plurality of modified pre-transmission signals, each modified pre-transmission signal from the plurality modified pre-transmission signals being uniquely associated with an antenna element from a plurality antenna elements; and sending the plurality of modified pre-transmission signals from the plurality of antenna elements to produce an effective combined transmitted signal.

19. The method of claim 18, wherein:

the complex weighting is associated with the total power of the transmitted signal and the phase rotation associated with each antenna element from the plurality of antenna elements, but not the power ratio associated with each antenna element from the plurality of antenna elements.

20. The method of claim 18, wherein the calculating of the complex weighting includes:

substantially optimizing the total power of the transmitted signal and the phase rotation associated with each antenna element from the plurality of antenna elements in parallel while maintaining a power ratio associated with each antenna element from the plurality of antenna elements.

21. A method for improving system performance of a first communication device, comprising:

receiving a quality-indication signal from a second communication device and a pre-transmission signal, the quality-indication signal being a CDMA power-control signal, the power-control signal having an increase indication, a decrease indication or a steady-state indication for each time period;

dividing the pre-transmission signal into a first signal component and a second signal component;

adjusting at least one characteristic associated with at least one from the group of the first signal component and the second signal component based on the quality-indication signal, the at least one characteristic being from the group of a power ratio and a phase rotation:

the adjusting of a phase rotation for each antenna element of the plurality of antenna elements including:

changing the phase rotation associated with the first signal component until a power-control signal has the increase indication for a second time period subsequent to a first time period; and the adjusting of a power ratio for each antenna element from the plurality of antenna elements including:

measuring, for each antenna element from the plurality of antenna elements, the power ratio associated with the transmit signal component associated with that antenna element when the remaining antenna elements from the plurality of antenna elements are disabled;

recording the power ratio associated with each antenna element relative to the remaining antenna elements from the plurality of antenna elements; and adjusting the power ratio associated with at least one from the group of the first signal component and the second signal component for each antenna element from the plurality of antenna elements so that the power ratio associated with each antenna element is substantially maintained; and combining the first signal component and the second signal component to produce a transmit signal component uniquely associated with an antenna element from a plurality of antenna elements, the transmit signal component for each antenna element from the plurality of antenna elements being a low-correlation version of the pre-transmission signal.

22. The method of claim 21, wherein adjusting the power is performed subsequent to adjusting the phase.

23. A first communication device having a plurality of antenna elements, comprising:

a control-logic component, the control-logic component receiving a quality indication signal from a second communication device and producing a plurality of complex weights; and a plurality of circuits coupled to the control-logic component, each circuit from the plurality of circuits being uniquely associated with an antenna element from the plurality of antenna elements, each circuit from the plurality of circuits producing a modified-pre-transmission signal based on the plurality of complex weights, the plurality of complex weights being associated with a total power of a transmitted signal and at least one from a phase rotation and a power ratio associated with each antenna element from the plurality of antenna elements, each circuit from the plurality of circuits having:

a filter, the filter configured to receive a pre-transmission signal and produce a first pre-transmission signal component and a second pre-transmission signal component;

a first signal adjuster coupled to the filter, the first signal adjuster configured to receive the first pre-transmission signal component and a complex weight from the plurality of complex weights, the first signal adjuster configured to send a modified-pre-transmission signal based on the complex weight for the first signal adjuster; and a second signal adjuster coupled to the filter, the second signal adjuster configured to receive the second signal component and a complex-weight signal from the plurality of complex-weight signals, the second signal adjuster configured to send a modified-pre-transmission signal based on the complex weight for the second signal adjuster, further comprising:

a plurality of antenna elements coupled to the plurality of circuits, the plurality of antenna elements being configured to send the plurality of modified-pre-transmission signals to produce a transmitted signal, the transmitted signal being configured to have an optimized power when received by the second communication device wherein:

the first signal adjuster is configured to modify at least one characteristic associated with the first pre-transmission signal component based on the complex weight received by the first signal adjuster, the at least one characteristic being from the group of a power and a phase rotation; and the second signal adjuster is configured to modify at least one characteristic associated with the second pre-transmission signal component based on the complex weight received by the second signal adjuster, the at least one characteristic being from the group of a power and a phase rotation wherein:

each circuit from the plurality of circuits further includes:

an analog-to-digital converter coupled to the filter; and a digital-to-analog converter coupled to the first signal adjuster and the second signal adjuster;

the first signal component produced by the filter is an in-phase pre-transmission signal; and the second signal component produced by the filter is a quadrature pre-transmission signal.

24. The first communication device of claim 23, wherein: the transmitted signal is sent by the first communication device based on at least one time-division multiple access (TDMA) protocol.

25. The first communication device of claim 23, wherein: the transmitted signal is sent by the first communication device based on at least one frequency-division multiple access (FDMA) protocol.

26. A method for a first communication device to communicate with a second communication device over a communication link, the first communication device having a plurality of antenna elements, the method comprising:
receiving a quality-indication signal from the second communication device, the quality-indication signal comprising a power-control bit according to a Code-Division Multiple-Access (CDMA) protocol, the power-control bit having a value for each time period from a plurality of time periods, the power-control bit being generated by the second communication device and indicating an adjustment to a power of a transmitted signal at the first communication device so that a predetermined threshold requirement for the second communication device can be satisfied;
calculating a complex weighting based on the quality-indication signal, the transmitted signal including a first power control group (PCG) and a second PCG, the first PCG being associated with its own phase rotation having a value and its own power ratio having a value, the second PCG being associated with its own phase rotation having the phase rotation value of the first PCG plus a phase offset and its own power ratio having the power ratio value of the first PCG plus a power ratio offset, the calculating of the complex weighting comprising:
adjusting a total power of the transmitted signal based on the received power control bit;
adjusting the phase rotation associated with the first PCG and the phase rotation associated with the second PCG if the value for the power-control bit at the most recent time period differs from the value for the power-control bit at the second most recent time period; and
adjusting the power ratio associated with the first PCG and the power ratio associated with the second PCG while maintaining the total power of the transmitted signal if the value for the power-control bit at the most recent time period differs from the value for the power-control bit at the second most recent time period;
modifying a pre-transmission signal based on the complex weighting to produce a plurality of modified pre-transmission signals, each modified pre-transmission signal from the plurality modified pre-transmission signals being uniquely associated with an antenna element of the plurality antenna elements; and
sending the plurality of modified pre-transmission signals from the plurality of antenna elements to produce the effective combined transmitted signal, the complex weighting being associated with the total power of the transmitted signal and at least one from a phase rotation and a power ratio associated with each antenna element from the plurality of antenna elements.

27. A method for communicating a signal, comprising:
receiving at a first communication device one or more quality-indication signals from one or more second communication devices, the first communication device comprising a plurality of antenna elements, wherein said quality-indication signal comprises a power control signal;
calculating a complex weighting according to the one or more quality-indication signals by:
adjusting a first modulation feature of a plurality of modulation features while maintaining a second modulation feature of the plurality of modulation features; and
adjusting the second modulation feature while maintaining the first modulation feature;
modulating at least a subset of a plurality of pre-transmission signals in accordance with the complex weighting, a pre-transmission signal of the plurality of pre-transmission signals associated with an antenna element of the plurality antenna elements, the subset of pre-transmission signals modulated by adjusting at least one modulation feature of the plurality of modulation features; and
sending the plurality of pre-transmission signals from the plurality of antenna elements to yield a combined transmitted signal, the complex weighting associated with an optimization of the combined transmitted signal.

28. The method of claim 27, wherein the optimization of the combined transmitted signal further comprises minimizing a total power of the combined transmitted signal.

29. The method of claim 27, wherein the optimization of the combined transmitted signal further comprises managing interference between the first communication device and the one or more second communication devices.

30. The method of claim 27, wherein the plurality of modulation features comprise a total power of the transmitted signal, a phase rotation associated with an antenna element, a power ratio associated with an antenna element, an amplitude associated with an antenna element, a time delay associated with an antenna element, and a frequency shift associated with an antenna element.

31. The method of claim 27, wherein calculating the complex weighting according to the one or more quality-indication signals further comprises adjusting at least a subset of the plurality of modulation features.

32. The method of claim 27, wherein calculating the complex weighting according to the one or more quality-indication signals further comprises:
substantially optimizing a first modulation feature of the plurality of modulation features; and
maintaining a second modulation feature of the plurality of modulation features.

33. The method of claim 27, wherein calculating the complex weighting according to the one or more quality-indication signals further comprises:
substantially minimizing a total power of the transmitted signal; and
maintaining a modulation feature of the plurality of modulation features.

34. The method of claim 27, wherein calculating the complex weighting according to the one or more quality-indication signals further comprises:
adjusting a first modulation feature of the plurality of modulation features;
and maintaining a second modulation feature of the plurality of modulation features.

35. The method of claim 27, wherein calculating the complex weighting according to the one or more quality-indication signals further comprises:

substantially adjusting a total power of the transmitted signal; and maintaining a modulation feature of the plurality of modulation features.

36. The method of claim 27, wherein the first communication device is operable to communicate with the one or more second communication devices using one or more communication links configured according to a Code Division Multiple Access (CDMA) protocol.

37. The method of claim 27, wherein the first communication device is operable to communicate with the one or more second communication devices using one or more communication links configured according to a Time Division Multiple Access (TDMA) protocol.

38. The method of claim 27, wherein the first communication device is operable to communicate with the one or more second communication devices using one or more communication links configured according to a Frequency Division Multiple Access (FDMA) protocol.

39. The method of claim 27, wherein:
the first communication device comprises a subscriber communication device; and
the one or more second communication devices comprise one or more base stations.

40. The method of claim 27, wherein:
the first communication device comprises a base station; and
the one or more second communication devices comprise one or more subscriber communication devices.

41. The method of claim 27, wherein:
the first communication device comprises a first base station; and
the one or more second communication devices comprise one or more second subscriber communication devices.

42. The method of claim 27, wherein:
the first communication device comprises a first subscriber communication device; and
the one or more second communication devices comprise one or more second base stations.

43. The method of claim 27, wherein the one or more quality-indication signals comprise a power-control bit, the power-control bit indicating a requested adjustment to a power of the transmitted signal associated with the first communication device.

44. The method of claim 27, wherein the one or more quality-indication signals comprise a frame quality indicator.

45. The method of claim 27, wherein modulating at least the subset of the plurality of pre-transmission signals in accordance with the complex weighting further comprises:
dividing a pre-transmission signal into a first signal component and a second signal component;
adjusting the first signal component and the second signal component in accordance with the complex weighting; and
combining the first signal component and the second signal component.

46. A first communication device for communicating a signal, comprising:
control logic operable to:
receive one or more quality-indication signals from one or more second communication devices, wherein quality-indication signal comprises a power control signal; and
calculate a complex weighting according to the one or more quality-indication signals by:
adjusting a first modulation feature of a plurality of modulation features while maintaining a second modulation feature of the plurality of modulation features; and
adjusting the second modulation feature while maintaining the first modulation feature; and
one or more circuits coupled to the control logic and operable to modulate at least a subset of a plurality of pre-transmission signals in accordance with the complex weighting, the subset of pre-transmission signals modulated by adjusting at least one modulation feature of the plurality of modulation features; and
a plurality of antenna elements coupled to the one or more circuits and operable to transmit the plurality of pre-transmission signals to yield a combined transmitted signal, a pre-transmission signal of the plurality of pre-transmission signals associated with an antenna element of the plurality antenna elements, the complex weighting associated with an optimization of the combined transmitted signal.

47. The first communication device of claim 46, wherein the optimization of the combined transmitted signal further comprises minimizing a total power of the combined transmitted signal.

48. The first communication device of claim 46, wherein the optimization of the combined transmitted signal further comprises managing interference between the first communication device and the one or more second communication devices.

49. The first communication device of claim 46, wherein the plurality of modulation features comprise a total power of the transmitted signal, a phase rotation associated with an antenna element, a power ratio associated with an antenna element, an amplitude associated with an antenna element, a time delay associated with an antenna element, and a frequency shift associated with an antenna element.

50. The first communication device of claim 46, the control logic operable to calculate the complex weighting according to the one or more quality-indication signals by adjusting at least a subset of the plurality of modulation features.

51. The first communication device of claim 46, the control logic operable to calculate the complex weighting according to the one or more quality-indication signals by:
substantially optimizing a first modulation feature of the plurality of modulation features; and
maintaining a second modulation feature of the plurality of modulation features.

52. The first communication device of claim 46, the control logic operable to calculate the complex weighting according to the one or more quality-indication signals by:
substantially minimizing a total power of the transmitted signal; and
maintaining a modulation feature of the plurality of modulation features.

53. The first communication device of claim 46, the control logic operable to calculate the complex weighting according to the one or more quality-indication signals by:
adjusting a first modulation feature of the plurality of modulation features; and
maintaining a second modulation feature of the plurality of modulation features.

54. The first communication device of claim 46, the control logic operable to calculate the complex weighting according to the one or more quality-indication signals by:
substantially adjusting a total power of the transmitted signal; and maintaining a modulation feature of the plurality of modulation features.

55. The first communication device of claim 46, operable to communicate with the one or more second communication devices using one or more communication links configured according to a Code Division Multiple Access (CDMA) protocol.

56. The first communication device of claim 46, operable to communicate with the one or more second communication devices using one or more communication links configured according to a Time Division Multiple Access (TDMA) protocol.

57. The first communication device of claim 46, operable to communicate with the one or more second communication devices using one or more communication links configured according to a Frequency Division Multiple Access (FDMA) protocol.

58. The first communication device of claim 46, wherein: the first communication device comprises a subscriber communication device; and the one or more second communication devices comprise one or more base stations.

59. The first communication device of claim 46, wherein: the first communication device comprises a base station; and the one or more second communication devices comprise one or more subscriber communication devices.

60. The first communication device of claim 46, wherein: the first communication device comprises a first base station; and the one or more second communication devices comprise one or more second subscriber communication devices.

61. The first communication device of claim 46, wherein: the first communication device comprises a first subscriber communication device; and the one or more second communication devices comprise one or more second base stations.

62. The first communication device of claim 46, wherein the one or more quality-indication signals comprise a power-control bit, the power-control bit indicating a requested adjustment to a power of the transmitted signal associated with the first communication device.

63. The first communication device of claim 46, wherein the one or more quality-indication signals comprise a frame quality indicator.

64. The first communication device of claim 46, the one or more circuits operable to modulate at least the subset of the plurality of pre-transmission signals in accordance with the complex weighting by:
dividing a pre-transmission signal into a first signal component and a second signal component;
adjusting the first signal component and the second signal component in accordance with the complex weighting; and
combining the first signal component and the second signal component.

65. A method for communicating a signal, comprising:
receiving at a first communication device one or more quality-indication signals from one or more second communication devices, the first communication device comprising a plurality of antenna elements;
calculating a complex weighting according to the one or more quality-indication signals by:
adjusting a first modulation feature of a plurality of modulation features while maintaining a second modulation feature of the plurality of modulation features until a first steady state is obtained;
adjusting the second modulation feature while maintaining the first modulation feature; and
adjusting the first modulation feature while maintaining the second modulation feature until a second steady state is obtained;
modulating at least a subset of a plurality of pre-transmission signals in accordance with the complex weighting, a pre-transmission signal of the plurality of pre-transmission signals associated with an antenna element of the plurality antenna elements, the subset of pre-transmission signals modulated by adjusting at least one modulation feature of the plurality of modulation features; and
sending the plurality of pre-transmission signals from the plurality of antenna elements to yield a combined transmitted signal, the complex weighting associated with an optimization of the combined transmitted signal.

66. A method for communicating a signal, comprising:
receiving at a first communication device one or more quality-indication signals from one or more second communication devices, the first communication device comprising a plurality of antenna elements;
calculating a complex weighting according to the one or more quality-indication signals by:
adjusting a first modulation feature of a plurality of modulation features while maintaining a second modulation feature of the plurality of modulation features; and
adjusting the second modulation feature while maintaining the first modulation feature;
modulating at least a subset of a plurality of pre-transmission signals in accordance with the complex weighting, a pre-transmission signal of the plurality of pre-transmission signals associated with an antenna element of the plurality antenna elements, the subset of pre-transmission signals modulated by adjusting at least one modulation feature of the plurality of modulation features; and
sending the plurality of pre-transmission signals from the plurality of antenna elements to yield a combined transmitted signal, the complex weighting associated with an optimization of the combined transmitted signal, wherein calculating the complex weighting according to the one or more quality-indication signals further comprises:
detecting a first steady state of the one or more quality-indication signals;
adjusting a phase rotation associated with an antenna element of the plurality of antenna elements;
selecting a first direction for the phase rotation associated with the antenna element; and
adjusting the phase rotation in the first direction until a second steady state of the one or more quality-indication signals is detected.

67. The method of claim 66, wherein said quality-indication signals comprise power control signals.

68. A method for communicating a signal, comprising:
receiving at a first communication device one or more quality-indication signals from one or more second communication devices, the first communication device comprising a plurality of antenna elements, the one or more quality-indication signals comprising a plurality of power control groups;
calculating a complex weighting according to the one or more quality-indication signals using one or more modulation features comprising a first set of modulation features and a second set of modulation features, calculating the complex weighting according to the one or more quality-indication signals further comprising:
adjusting the first set while maintaining the second set if a first bit value for a power-control bit at a first time period corresponds to a second bit value for a power-control bit at a second time period; and
adjusting the second set while maintaining the first set if the first bit value differs from the second bit value;
modulating at least a subset of a plurality of pre-transmission signals in accordance with the complex weighting, a pre-transmission signal of the plurality of pre-transmission signals associated with an antenna element of the plurality antenna elements, the subset of pre-transmission signals modulated by adjusting at least one modulation feature of the one or more modulation features; and
sending the plurality of pre-transmission signals from the plurality of antenna elements to yield a combined transmitted signal, the complex weighting associated with an optimization of the combined transmitted signal.

69. A method for communicating a signal, comprising:
receiving at a first communication device one or more quality-indication signals from one or more second communication devices, the first communication device comprising a plurality of antenna elements, the one or more quality-indication signals comprising a plurality of power control groups;
calculating a complex weighting according to the one or more quality-indication signals by:
adjusting a total power of a transmitted signal while maintaining one or more modulation features of a plurality of modulation features of the plurality of power control groups if a first bit value for a power-control bit at a first time period corresponds to a second bit value for a power-control bit at a second time period; and
adjusting the one or more modulation features of the plurality of modulation features while maintaining the total power of the transmitted signal if the first bit value differs from the second bit value;
modulating at least a subset of a plurality of pre-transmission signals in accordance with the complex weighting, a pre-transmission signal of the plurality of pre-transmission signals associated with an antenna element of the plurality antenna elements, the subset of pre-transmission signals modulated by adjusting at least one modulation feature of the plurality of modulation features; and
sending the plurality of pre-transmission signals from the plurality of antenna elements to yield a combined transmitted signal, the complex weighting associated with an optimization of the combined transmitted signal.

70. A first communication device for communicating a signal, comprising:
control logic operable to:
receive one or more quality-indication signals from one or more second communication devices; and
calculate a complex weighting according to the one or more quality-indication signals by:
adjusting a first modulation feature of a plurality of modulation features while maintaining a second modulation feature of the plurality of modulation features until a first steady state is obtained;
adjusting the second modulation feature while maintaining the first modulation feature; and
adjusting the first modulation feature while maintaining the second modulation feature until a second steady state is obtained;
one or more circuits coupled to the control logic and operable to modulate at least a subset of a plurality of pre-transmission signals in accordance with the complex weighting, the subset of pre-transmission signals modulated by adjusting at least one modulation feature of the plurality of modulation features; and
a plurality of antenna elements coupled to the one or more circuits and operable to transmit the plurality of pre-transmission signals to yield a combined transmitted signal, a pre-transmission signal of the plurality of pre-transmission signals associated with an antenna element of the plurality antenna elements, the complex weighting associated with an optimization of the combined transmitted signal.

71. A first communication device for communicating a signal, comprising:
control logic operable to:
receive one or more quality-indication signals from one or more second communication devices; and
calculate a complex weighting according to the one or more quality-indication signals by:
adjusting a first modulation feature of a plurality of modulation features while maintaining a second modulation feature of the plurality of modulation features; and
adjusting the second modulation feature while maintaining the first modulation feature; and
one or more circuits coupled to the control logic and operable to modulate at least a subset of a plurality of pre-transmission signals in accordance with the complex weighting, the subset of pre-transmission signals modulated by adjusting at least one modulation feature of the plurality of modulation features; and
a plurality of antenna elements coupled to the one or more circuits and operable to transmit the plurality of pre-transmission signals to yield a combined transmitted signal, a pre-transmission signal of the plurality of pre-transmission signals associated with an antenna element of the plurality antenna elements, the complex weighting associated with an optimization of the combined transmitted signal, the control logic operable to calculate the complex weighting according to the one or more quality-indication signals by:
detecting a first steady state of the one or more quality-indication signals;
adjusting a phase rotation associated with an antenna element of the plurality of antenna elements;
selecting a first direction for the phase rotation associated with the antenna element; and
adjusting the phase rotation in the first direction until a second steady state of the one or more quality-indication signals is detected.

72. The first communication device of claim 71, wherein said quality-indication signals comprise power control signals.

73. A first communication device for communicating a signal, comprising:
control logic operable to:
receive one or more quality-indication signals from one or more second communication devices, the one or more quality-indication signals comprising a plurality of power control groups;
calculate a complex weighting according to the one or more quality-indication signals using one or more modulation features comprising a first set of modulation features and a second set of modulation features, the control logic operable to calculate the complex weighting according to the one or more quality-indication signals by:
  adjusting the first set while maintaining the second set if a first bit value for a power-control bit at a first time period corresponds to a second bit value for a power-control bit at a second time period; and
  adjusting the second set while maintaining the first set if the first bit value differs from the second bit value;
one or more circuits coupled to the control logic and operable to modulate at least a subset of a plurality of pre-transmission signals in accordance with the complex weighting, the subset of pre-transmission signals modulated by adjusting at least one modulation feature of the one or more modulation features; and
a plurality of antenna elements coupled to the one or more circuits and operable to transmit the plurality of pre-transmission signals to yield a combined transmitted signal, a pre-transmission signal of the plurality of pre-transmission signals associated with an antenna element of the plurality antenna elements, the complex weighting associated with an optimization of the combined transmitted signal.

74. A first communication device for communicating a signal, comprising:
control logic operable to:
  receive one or more quality-indication signals from one or more second communication devices, the one or more quality-indication signals comprising a plurality of power control groups; and
  calculate a complex weighting according to the one or more quality-indication signals by:
    adjusting a total power of the transmitted signal while maintaining one or more modulation features of a plurality of modulation features of the plurality of power control groups if a first bit value for a power-control bit at a first time period corresponds to a second bit value for a power-control bit at a second time period; and
    adjusting the one or more modulation features of the plurality of modulation features while maintaining the total power of the transmitted signal if the first bit value differs from the second bit value;
one or more circuits coupled to the control logic and operable to modulate at least a subset of a plurality of pre-transmission signals in accordance with the complex weighting, the subset of pre-transmission signals modulated by adjusting at least one modulation feature of the plurality of modulation features; and
a plurality of antenna elements coupled to the one or more circuits and operable to transmit the plurality of pre-transmission signals to yield a combined transmitted signal, a pre-transmission signal of the plurality of pre-transmission signals associated with an antenna element of the plurality antenna elements, the complex weighting associated with an optimization of the combined transmitted signal.

75. A system for communicating a signal, comprising:
means for receiving at a first communication device one or more quality-indication signals from one or more second communication devices, the first communication device comprising a plurality of antenna elements, wherein said quality-indication signal comprises a power control signal;
means for calculating a complex weighting according to the one or more quality-indication signals by:
  adjusting a first modulation feature of a plurality of modulation features while maintaining a second modulation feature of the plurality of modulation features; and
  adjusting the second modulation feature while maintaining the first modulation feature;
means for modulating at least a subset of a plurality of pre-transmission signals in accordance with the complex weighting, a pre-transmission signal of the plurality of pre-transmission signals associated with an antenna element of the plurality antenna elements, the subset of pre-transmission signals modulated by adjusting at least one modulation feature of the plurality of modulation features; and
means for sending the plurality of pre-transmission signals from the plurality of antenna elements to yield a combined transmitted signal, the complex weighting associated with an optimization of the combined transmitted signal.

* * * * *